US012659650B2

(12) United States Patent
Wang et al.

(10) Patent No.: US 12,659,650 B2
(45) Date of Patent: Jun. 16, 2026

(54) ACOUSTIC OUTPUT DEVICES WITH REDUCED SOUND LEAKAGE

(71) Applicant: SHENZHEN SHOKZ CO., LTD., Shenzhen (CN)

(72) Inventors: Zhen Wang, Shenzhen (CN); Lei Zhang, Shenzhen (CN)

(73) Assignee: SHENZHEN SHOKZ CO., LTD., Shenzhen (CN)

(*) Notice: Subject to any disclaimer, the term of this patent is extended or adjusted under 35 U.S.C. 154(b) by 284 days.

(21) Appl. No.: 18/447,268

(22) Filed: Aug. 9, 2023

(65) Prior Publication Data

US 2024/0323589 A1 Sep. 26, 2024

Related U.S. Application Data

(63) Continuation of application No. PCT/CN2023/083554, filed on Mar. 24, 2023.

(51) Int. Cl.

*H04R 1/28* (2006.01)
*H04R 1/10* (2006.01)
*H04R 1/34* (2006.01)

(52) U.S. Cl.

CPC ......... *H04R 1/2811* (2013.01); *H04R 1/1008* (2013.01); *H04R 1/345* (2013.01); *H04R 2460/09* (2013.01); *H04R 2460/11* (2013.01)

(58) Field of Classification Search

CPC ...... H04R 2205/02; H04R 1/30; H04R 1/347; H04R 1/2811; H04R 1/1008; H04R 1/345; H04R 2460/09; H04R 2460/11

USPC ......... 381/150, 152, 337, 345, 370, 73.1, 74

See application file for complete search history.

(56) References Cited

U.S. PATENT DOCUMENTS 5,109,416 A * 4/1992 Croft ......................... H04R 5/02 381/1
9,794,676 B2 10/2017 Shetye et al.
2019/0020940 A1* 1/2019 Silver .................. H04R 1/1008
2021/0058693 A1* 2/2021 Woelfl ................. H04R 1/2807

(Continued)

FOREIGN PATENT DOCUMENTS

CN 111343552 A 6/2020
CN 212064357 U 12/2020

(Continued)

OTHER PUBLICATIONS

Notice of Reasons for Rejection in Japanese Application No. 2025508495 mailed on Jan. 20, 2026, 10 pages.

(Continued)

*Primary Examiner* — Norman Yu

(74) *Attorney, Agent, or Firm* — METIS IP LLC

(57) ABSTRACT

The embodiments of the present disclosure provide an acoustic output device including a sound emitting part. The sound emitting part may include at least one acoustic driver, and a first chamber, and a second chamber acoustically coupled to the at least one acoustic driver. The first chamber may have at least one first sound outlet, and the second chamber has at least one second sound outlet. The at least one acoustic driver may radiate sounds to an external environment through the at least one first sound outlet and the at least one second sound outlet. In at least a portion of a low-frequency range, the sounds emitted by the sound emitting part towards a far field may exhibit directivity.

18 Claims, 16 Drawing Sheets

(56) References Cited

U.S. PATENT DOCUMENTS

| | | | | |
|---|---|---|---|---|
| 2021/0067857 | A1 | 3/2021 | Struzik | |
| 2021/0112329 | A1 | 4/2021 | Zhang et al. | |
| 2021/0127197 | A1* | 4/2021 | Zhang .................. | H04R 1/2896 |
| 2022/0159366 | A1* | 5/2022 | Porter .................. | H04R 1/1008 |
| 2022/0360888 | A1 | 11/2022 | Zhang et al. | |

FOREIGN PATENT DOCUMENTS

| | | | | |
|---|---|---|---|---|
| CN | 112929769 | A | 6/2021 | |
| CN | 217643682 | U | 10/2022 | |
| WO | 2019192816 | A1 | 10/2019 | |
| WO | WO-2021052046 | A1 * | 3/2021 | ........... H04R 1/2884 |

OTHER PUBLICATIONS

The Extended European Search Report in European Application No. 23929035.6 mailed on Sep. 16, 2025, 15 pages.

* cited by examiner

300

900

ACOUSTIC OUTPUT DEVICES WITH REDUCED SOUND LEAKAGE

CROSS-REFERENCE RELATED TO APPLICATIONS

This application is a continuation of International Application No. PCT/CN2023/083554, filed on Mar. 24, 2023, the entire contents of which are hereby incorporated by reference.

TECHNICAL FIELD

The present disclosure relates to the field of acoustics, and specifically, to an acoustic output device.

BACKGROUND

In the process of outputting sound, an acoustic output device radiate most of sound waves toward a user's ear canal opening, but inevitably, some sound waves also radiate in other directions (e.g., away from the ear canal opening), resulting in a certain degree of sound leakage from the acoustic output devices. Therefore, it is of great significance to have directional propagation of sound waves in order to reduce sound leakage in acoustic output devices. Existing acoustic output devices typically use a dipole formed by two sound sources with equal amplitudes and opposite phases to create a directional radiating sound field, thereby achieving directional sound propagation. However, in this manner, while achieving sound wave propagation in a specific direction, a relatively high sound field intensity is also formed in an opposite direction to the specific direction. This means that significant sound leakage may still be heard when someone is located directly in front of or to a side of a listener.

Therefore, it is necessary to design an acoustic output device that maximizes the volume in the direction of the listener's ear canal opening while minimizing sound leakage in other directions, thereby achieving better privacy in sound listening.

SUMMARY

One or more embodiments of the present disclosure provide an acoustic output device including a sound emitting part. The sound emitting part may include at least one acoustic driver, a first chamber, and a second chamber. The first chamber and the second chamber are acoustically coupled to the at least one acoustic driver. The first chamber has at least one first sound outlet and the second chamber may have at least one second sound outlet. The at least one acoustic driver may radiate sounds to the outside through the at least one first sound outlet and the at least one second sound outlet. In at least a portion of a low-frequency range, the sounds emitted by the sound emitting part towards a far field may exhibit directivity. The directivity may be characterized by a sound pressure difference of not less than 3 dB, in at least one pair of opposite directions, between a sound radiated from the at least one first sound outlet and a sound radiated from the at least one second sound outlet.

In one or more embodiments of the present disclosure, the at least one acoustic driver may be a single acoustic driver, and the acoustic driver may have a front side and a rear side, and radiate the sounds to the first chamber and the second chamber, respectively, through the front side and the rear side.

In one or more embodiments of the present disclosure, the at least one acoustic driver may include two acoustic drivers, and the two acoustic drivers may radiate the sounds to the first chamber and the second chamber, respectively.

In one or more embodiments of the present disclosure, the at least one acoustic driver may radiate a first sound to the outside through the at least one first sound outlet and a second sound to the outside through the at least one second sound outlet, and a phase difference between the first sound and the second sound is in a range of 120° to 179°.

In one or more embodiments of the present disclosure, the phase difference between the first sound and the second sound may be in a range of 170° to 179°.

In one or more embodiments of the present disclosure, the phase difference between the first sound and the second sound may be inversely correlated with frequency within a predetermined frequency range.

In one or more embodiments of the present disclosure, the first sound may propagate in the first chamber with a first sound path, and the second sound propagates in the second chamber with a second sound path, and the first sound path and the second sound path have a sound path difference.

In one or more embodiments of the present disclosure, at least one of the first chamber or the second chamber may be equipped with an acoustic structure, and the acoustic structure may include one or more baffles.

In one or more embodiments of the present disclosure, the first chamber or the second chamber may be equipped with at least one of an acoustic mesh or an acoustic porous material.

In one or more embodiments of the present disclosure, the first chamber or the second chamber may be equipped with an expansion acoustic structure, and the expansion acoustic structure changes a cross-sectional area of the first chamber or the second chamber at different positions along a sound transmission path.

In one or more embodiments of the present disclosure, the first chamber or the second chamber may be equipped with a sound absorption structure, and a resonant frequency of the sound absorption structure is in a range of 1000 Hz to 3000 Hz.

In one or more embodiments of the present disclosure, electrical drive signals corresponding to the two acoustic drivers may have different phases.

In one or more embodiments of the present disclosure, the acoustic output device may further include a support structure, which is designed to be worn on a user's head or upper body, and is configured to support the sound emitting part and position the sound emitting part near the user's ears without blocking the ear canal opening.

One or more embodiments of the present disclosure further provide an acoustic output device including a sound emitting part. The sound emitting part may include at least one acoustic driver, a first chamber, and a second chamber. The first chamber, and the second chamber may be acoustically coupled to the at least one acoustic driver. The first chamber may have at least one first sound outlet and the second chamber may have at least one second sound outlet. The at least one acoustic driver may radiate a first sound to the outside through the first chamber and at least one first sound outlet, and radiate a second sound to the outside through the second chamber and at least one second sound outlet, at 1000 Hz, a phase difference between the first sound and the second sound is in a range of 125° to 178°.

In one or more embodiments of the present disclosure, a distance between an acoustic center of the first sound outlet and an acoustic center of the second sound outlet may be within a range of 2 mm to 60 mm.

In one or more embodiments of the present disclosure, at 1000 Hz, the phase difference between the first sound and the second sound may be in a range of 174° to 178°.

In one or more embodiments of the present disclosure, a distance between an acoustic center of the first sound outlet and an acoustic center of the second sound outlet may be within a range of 2 mm to 4 mm.

In one or more embodiments of the present disclosure, at 1000 Hz, the phase difference between the first sound and the second sound may be in a range of 170° to 177°.

In one or more embodiments of the present disclosure, a distance between an acoustic center of the first sound outlet and an acoustic center of the second sound outlet may be within a range of 4 mm to 8 mm.

In one or more embodiments of the present disclosure, at 1000 Hz, the phase difference between the first sound and the second sound may be in a range of 162° to 173°.

In one or more embodiments of the present disclosure, a distance between an acoustic center of the first sound outlet and an acoustic center of the second sound outlet may be within a range of 8 mm to 16 mm.

In one or more embodiments of the present disclosure, at 1000 Hz, the phase difference between the first sound and the second sound may be in a range of 158° to 165°.

In one or more embodiments of the present disclosure, a distance between an acoustic center of the first sound outlet and an acoustic center of the second sound outlet may be within a range of 16 mm to 20 mm.

In one or more embodiments of the present disclosure, at 2000 Hz, the phase difference between the first sound and the second sound may be in a range of 138° to 177°.

In one or more embodiments of the present disclosure, a distance between an acoustic center of the first sound outlet and an acoustic center of the second sound outlet may be within a range of 2 mm to 20 mm.

In one or more embodiments of the present disclosure, at 2000 Hz, the phase difference between the first sound and the second sound may be in a range of 170° to 175°.

In one or more embodiments of the present disclosure, a distance between an acoustic center of the first sound outlet and an acoustic center of the second sound outlet may be within a range of 2 mm to 4 mm.

In one or more embodiments of the present disclosure, at one of a plurality of frequency values within a frequency range of 500 Hz to 3000 Hz, the phase difference between the first sound and the second sound may be in a range of 121° to 179°.

In one or more embodiments of the present disclosure, a distance between an acoustic center of the first sound outlet and an acoustic center of the second sound outlet may range from 2 mm to 20 mm.

In one or more embodiments of the present disclosure, at one of the plurality of frequency values within the frequency range of 500 Hz to 3000 Hz, the phase difference between the first sound and the second sound may be in a range of 175° to 179°.

In one or more embodiments of the present disclosure, a distance between an acoustic center of the first sound outlet and an acoustic center of the second sound outlet may range from 2 mm to 4 mm.

In one or more embodiments of the present disclosure, within the frequency range of 500 Hz to 3000 Hz, the phase difference between the first sound and the second sound may be in a range of 145° to 179°.

In one or more embodiments of the present disclosure, a distance between an acoustic center of the first sound outlet and an acoustic center of the second sound outlet may range from 2 mm to 10 mm.

In one or more embodiments of the present disclosure, within the frequency range of 500 Hz to 3000 Hz, the phase difference between the first sound and the second sound may be in a range of 175° to 179°.

In one or more embodiments of the present disclosure, a distance between an acoustic center of the first sound outlet and an acoustic center of the second sound outlet may range from 2 mm to 4 mm.

In one or more embodiments of the present disclosure, at 200 Hz, the phase difference between the first sound and the second sound may be greater than 175° and less than 179.8°.

In one or more embodiments of the present disclosure, a distance between an acoustic center of the first sound outlet and an acoustic center of the second sound outlet may range from 2 mm to 20 mm.

In one or more embodiments of the present disclosure, at 200 Hz, the phase difference between the first sound and the second sound may be in a range of 177° to 179.8°.

In one or more embodiments of the present disclosure, a distance between an acoustic center of the first sound outlet and an acoustic center of the second sound outlet may range from 2 mm to 4 mm.

In one or more embodiments of the present disclosure, within a predetermined frequency range, the phase difference between the first sound and the second sound may be inversely correlated with frequency.

In one or more embodiments of the present disclosure, the at least one acoustic driver may be a single acoustic driver having a front side and a back side, and radiate sound to the first chamber and the second chamber through the front side and the back side, respectively.

In one or more embodiments of the present disclosure, the at least one acoustic driver may include two acoustic drivers that radiate the sounds to the first chamber and the second chamber, respectively.

In one or more embodiments of the present disclosure, electrical drive signals corresponding to the two acoustic drivers may have different phases.

In one or more embodiments of the present disclosure, the first sound propagates in the first chamber with a first path length and the second sound propagates in the second chamber with a second path length, and the first path length and the second path length may have a path length difference.

In one or more embodiments of the present disclosure, at least one of the first chamber or the second chamber is equipped with an acoustic structure, and the acoustic structure may include one or more baffles.

In one or more embodiments of the present disclosure, the first chamber or the second chamber may be equipped with at least one of an acoustic mesh or an acoustic porous material.

In one or more embodiments of the present disclosure, the first chamber or the second chamber may be equipped with an expansion acoustic structure, and the expansion acoustic structure may change a cross-sectional area of the first chamber or the second chamber at different positions along a sound transmission path.

In one or more embodiments of the present disclosure, the first chamber or the second chamber may be equipped with a sound absorption structure, and a resonant frequency of the sound absorption structure may be within a range of 1000 Hz to 3000 Hz.

In one or more embodiments of the present disclosure, the acoustic output device may further include a support structure which is designed to be worn on a user's head or upper body, and may be configured to support the sound emitting part and position the sound emitting part near the user's ear without blocking the ear canal opening.

The acoustic output device provided in one or more embodiments of the present disclosure can achieve directivity of the sounds radiated from the sound emitting part towards a far field by controlling the phase difference between the first sound and the second sound. This ensures a higher volume in the direction of the listener's ear canal opening and reduces sound leakage towards the opposite direction of the listener's ear canal opening and other directions, thereby striking a balance between ear canal opening openness and listening privacy.

BRIEF DESCRIPTION OF THE DRAWINGS

The present disclosure will be further illustrated by way of exemplary embodiments, which will be described in detail with the accompanying drawings. These embodiments are not restrictive and in these embodiments, a same number may indicate a same structure, wherein.

DETAILED DESCRIPTION

Figure 1:
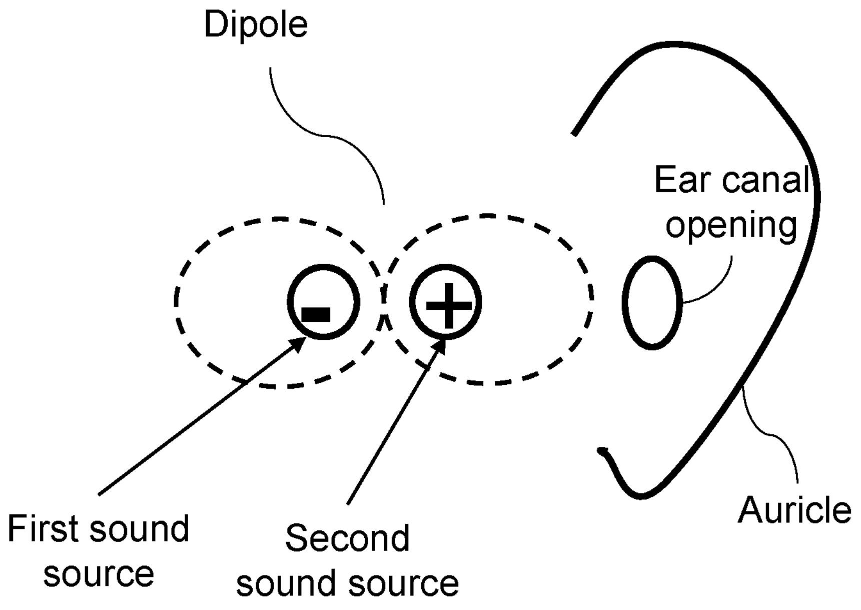
FIG. 1 is an exemplary schematic diagram illustrating a directional radiating sound field of an acoustic output device according to some embodiments of the present disclosure.

In order to more clearly illustrate the technical solutions of the embodiments of the present disclosure, the following briefly introduces the drawings that need to be used in the description of the embodiments. Apparently, the accompanying drawings in the following description are only some examples or embodiments of the present disclosure, and those skilled in the art may also apply the present disclosure to other similar scenarios. Unless obviously obtained from the context or the context illustrates otherwise, the same numeral in the drawings refers to the same structure or operation.

It should be understood that "system", "device", "unit" and/or "module" as used herein for distinguishing different components, elements, parts, parts, or assemblies of different levels. However, the words may be replaced by other expressions if other words may achieve the same purpose.

As indicated in the disclosure and claims, the terms "one", "an", "an" and/or "the" are not specific to the singular and may include the plural unless the context clearly indicates an exception. Generally speaking, the terms "comprises", "comprising", "includes", "including" only suggest the inclusion of clearly identified steps and elements, and these steps and elements do not constitute an exclusive list, and the method or device may also contain other steps or elements.

Flowcharts are used in this disclosure to illustrate operations performed by the system according to the embodiments of the present disclosure. It should be understood that the preceding or following operations are not necessarily performed in the exact order. Instead, various steps may be processed in reverse order or simultaneously. At the same time, other operations may be added to these procedures, or a certain step or steps may be removed from these procedures.

FIG. 1 shows a schematic diagram of an exemplary directional radiating sound field of an acoustic output device according to some embodiments of the present disclosure.

The acoustic output device emits sounds near a listener's ear, resulting in the sounds being radiated into a surrounding environment, thereby leading to significant sound leakage from the acoustic output device. To reduce the sound leakage of the acoustic output device and ensure that more sound reaches the listener's ear canal opening, some embodiments employ a dipole configuration composed of two sound sources (referred to as a first sound source and a second sound source) with equal amplitude and opposite phases, as shown in FIG. 1. This dipole configuration forms a directional radiating sound field resembling a figure "8" pattern, as depicted in FIG. 1. The figure "8" directional radiating sound field includes two main lobes, representing two directions with strong radiation. In order to enhance the listening experience for a user, positions of the two sound sources may be adjusted so that one main lobe points toward the listener's ear canal opening, ensuring a sufficient sound level from the acoustic output device. Meanwhile, according to the schematic diagram of the directional radiating sound field of the dipole configuration in FIG. 1, when one main lobe points toward the listener's ear canal opening, the other main lobe usually points towards the listener's front or side. This also means that when other individuals are positioned in front or to a side of the listener, they may also be able to clearly hear the sound leakage from the acoustic output device.

To further reduce the sound leakage of the acoustic output device, some embodiments of the present disclosure provide an acoustic output device comprising a sound emitting part and a supporting structure for supporting the sound emitting part. When the user wears the acoustic output device, the supporting structure may be configured to position the sound emitting part near the user's ears without blocking the ear canal opening. In some embodiments, the sound emitting part may emit a sound to the surrounding environment. The sound emitting part may include at least one acoustic driver, a first chamber, and a second chamber acoustically coupled to the at least one acoustic driver. The first chamber may be equipped with at least one first sound outlet, and the second chamber may be equipped with at least one second sound outlet. The at least one acoustic driver may emit a sound (referred to as a first sound) to the surrounding environment through the at least one first sound outlet of the first chamber, and emit a sound (referred to as a second sound) to the surrounding environment through the at least one second sound outlet of the second chamber. The first sound and the second sound have a certain phase difference, and when this phase difference satisfies a certain condition, the acoustic output device may output a high-volume sound in a specific direction (e.g., a direction of the user's ear canal opening) while suppressing sound leakage in an opposite direction of the specific direction. In some embodiments, the phase difference between the first sound and the second sound may range from 120° to 179°.

In some embodiments, by controlling the phase difference between the two sounds generated by the sound emitting part, directional sound radiation (demonstrated by a sound pressure difference of no less than 6 dB in at least one opposite direction) may be achieved in a far field in a low frequency range. This ensures a higher sound volume in the direction of the listener's ear canal opening and reduces sound leakage towards the opposite direction of the listener's ear canal opening and other directions, thereby ensuring a balance between ear canal opening openness and listening privacy.

Figure 2:
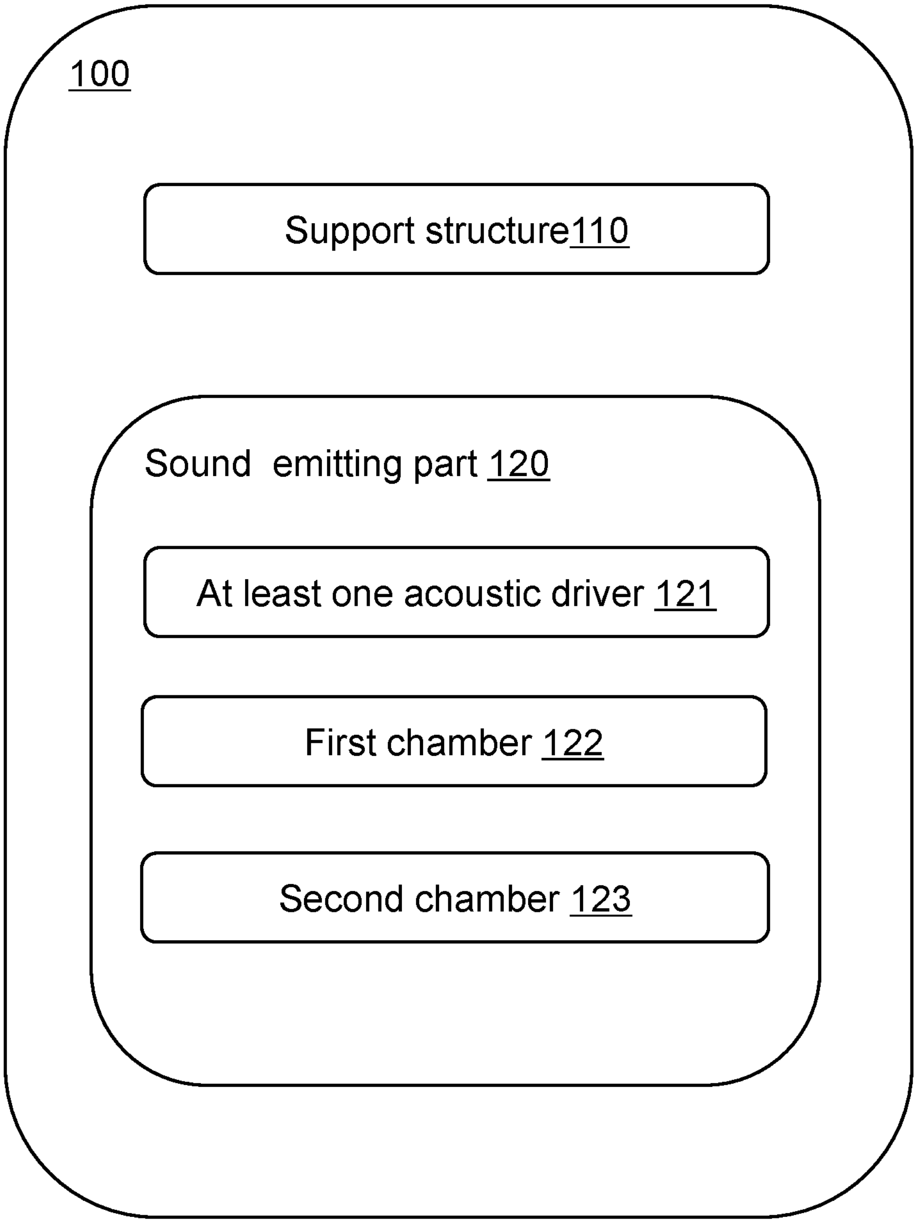
FIG. 2 is a structural diagram illustrating an exemplary acoustic output device according to some embodiments of the present disclosure.

FIG. 2 is a structural diagram illustrating an exemplary acoustic output device according to some embodiments of the present disclosure. As shown in FIG. 2, an acoustic output device 100 may include a support structure 110 and a sound emitting part 120.

The support structure 110 may be configured to support the sound emitting part 120. In some embodiments, when a user wears the acoustic output device 100, the support structure 110 may be placed on the user's head or upper body. In some embodiments, the support structure 110 may include an arc structure that is compatible with the user's auricle. As an illustrative example, the arc structure may include, but is not limited to, a hook shape, a C shape, or the like. When the user wears the acoustic output device 100, the support structure 110 may be positioned or clamped on the user's auricle, allowing for the wearing of the acoustic output device 100. In some embodiments, the support structure 110 may also include an ear-hook structure that is compatible with the user's head or upper body. When the user wears the acoustic output device 100, the ear-hook structure may be hung on the user's auricle through the user's head or neck, enabling the wearing of the acoustic output device 100.

In some embodiments, the support structure 110 may be made of a material that is relatively soft, or relatively hard, or a combination thereof. A relatively soft material refer to a material with a hardness (e.g., Shore hardness) smaller than a first hardness threshold (e.g., 15 A, 20 A, 30 A, 35 A, 40 A, etc.). For example, the Shore hardness of the relatively soft material may range from 45-85 A, 30-60 D. A relatively hard material refer to a material with a hardness (e.g., Shore hardness) greater than a second hardness threshold (e.g., 65 D, 70 D, 80 D, 85 D, 90 D, etc.). Exemplary relatively soft materials may include, but are not limited to, polyurethanes (PU) (e.g., thermoplastic polyurethane elastomers (TPU)), polycarbonate (PC), polyamides (PA), acrylonitrile butadiene styrene (ABS), polystyrene (PS), high impact polystyrene (HIPS), polypropylene (PP), polyethylene terephthalate (PET), polyvinyl chloride (PVC), polyurethanes (PU), polyethylene (PE), phenol formaldehyde (PF) resin, urea-formaldehyde (UF) resin, melamine-formaldehyde (MF) resin, silicone, or combinations thereof. Exemplary relatively hard materials may include, but are not limited to, poly(ester-sulfones) (PES), polyvinylidene chloride (PVDC), polymethyl methacrylate (PMMA), polyether ether ketone (PEEK), or combinations thereof, or mixtures thereof with reinforcing agents such as a glass fiber, a carbon fiber, or the like. In some embodiments, the material of the support structure 110 may be selected based on a specific requirement. For example, using the relatively soft material may enhance comfort and fit with the user's ear when wearing the acoustic output device 100, while using the relatively hard material may enhance strength of the acoustic output device 100.

The sound emitting part 120 may be configured to generate and emit sound. In some embodiments, the acoustic output device 100 may secure, via the support structure 110, the sound emitting part 120 near the user's ear without blocking the user's ear canal opening, allowing the user's ear to remain in an open state. By keeping the user's ear open, the user may both hear the sound emitted by the sound emitting part 120 and perceive a sound from an external environment.

In some embodiments, the sound emitting part 120 may include at least one acoustic driver 121, a first chamber 122, and a second chamber 123. The first chamber 122 and the second chamber 123 may be acoustically coupled to the acoustic driver 121. In some embodiments, the first chamber 122 may be equipped with at least one first sound outlet, and the at least one acoustic driver 121 may emit a sound (also referred to as the first sound) to the external environment through the first chamber 122 via the at least one first sound outlet. The second chamber 123 may be equipped with at least one second sound outlet, and the at least one acoustic driver 121 may emit a sound (also referred to as the second sound) to the external environment through the second chamber 123 via the at least one second sound outlet.

The acoustic driver 121 may be a device capable of converting an electrical signal into a sound signal and outputting the sound signal. By way of example, the acoustic driver 121 may include a diaphragm, a coil, and a magnetic assembly capable of driving the diaphragm to vibrate. In some embodiments, a count of the at least one acoustic driver 121 may be one. In such cases, the acoustic driver 121 may have a front side and a rear side, radiating sounds to the first chamber 122 and the second chamber 123 from the front and rear sides, respectively. For instance, the front side of the acoustic driver 121 may be a side of the diaphragm facing away from the magnetic assembly, while the rear side may be a side of the diaphragm facing towards the magnetic assembly or a side of the magnetic assembly facing away from the diaphragm. When vibrating, the sides of the diaphragm facing away from and towards the magnetic assembly may produce sounds with the same amplitude and opposite phases. By configuring the sound transmission paths within the sound emitting part 120, a specific phase difference (e.g., ranging from 120° to 179°) may be achieved between the first sound emitted through the at least one first sound outlet after passing through the first chamber 122 and the second sound emitted through the second sound outlet after passing through the second chamber 123. In some embodiments, the first chamber 122 and the second chamber 123 may be positioned on either side of the diaphragm, allowing the diaphragm to radiate sound to the first chamber 122 and the second chamber 123 when vibrating. The sound radiated by the diaphragm towards the first chamber 122 may be transmitted through a first sound transmission path to the first sound outlet and emitted externally (resulting in the first sound). Similarly, the sound radiated by the diaphragm towards the second chamber 123 may be transmitted through a second sound transmission path to the second sound outlet and emitted externally (resulting in the second sound). In some embodiments, the phases of the first sound and the second sound may be controlled by adjusting an acoustic structure(s) of at least one of the first chamber 122 or the second chamber 123.

In some embodiments, the count of the at least one acoustic driver 121 may be may be two or more. The two acoustic drivers 121 may be driven by two sets of electrical signals respectively. The two acoustic drivers 121 may radiate sounds to the first chamber 122 and the second chamber 123. In some embodiments, magnitude and phases of the sounds radiated by the two acoustic drivers 121 to the first chamber 122 and the second chamber 123 may be controlled by adjusting the magnitude and phases of the electrical signals driving the two acoustic drivers 121. This allows for controlling the magnitude and the phase of the first sound emitted through the at least one first sound outlet after passing through the first chamber 122, as well as the magnitude and the phase of the second sound emitted through the second sound outlet after passing through the second chamber 123. In some embodiments, the phases of the first sound and the second sound may also be controlled by adjusting the acoustic structure(s) of at least one of the first chamber 122 or the second chamber 123.

The first chamber 122 and the second chamber 123 may be acoustically coupled to the at least one acoustic driver 121. The first chamber 122 and the second chamber 123 may be configured to transmit sounds generated by the at least one acoustic driver 121. A sound within the first chamber 122 may radiate outward through the at least one first sound outlet, while a sound within the second chamber 123 may radiate outward through the at least one second sound outlet. In some embodiments, a count of at least one of the at least one first sound outlet(s) or the at least one second sound outlet(s) may be one or more. The count of sound outlets may be reasonably set according to actual needs, and the present disclosure does not provide specific limitations on it.

In some embodiments, at least one acoustic structure (of at least one of the first chamber 122 or the second chamber 123) may change the phases of the sounds radiated from the sound outlets of the chambers. In some embodiments, at least one of the phase of the first sound radiated from the first sound outlet by the acoustic driver 121 or the phase of the second sound radiated from the second sound outlet by the acoustic driver 121 may be controlled by adjusting the acoustic structure(s) of at least one of the first chamber 122 or the second chamber 123. This adjusts the phase difference between the first sound and the second sound, thereby improving the sound leakage of the acoustic output device 100. For example, when sounds with opposite phases is generated on the front and rear sides of the acoustic driver 121, one or more baffles may be placed in at least one of the first chamber 122 or the second chamber 123 to create different sound paths in the two chambers. This results in different phase variations of the first sound and the second sound during propagation within the chambers, thereby adjusting the phase difference between the first sound at the first sound outlet and the second sound at the second sound outlet (i.e., the phase difference between the first sound and the second sound). Additionally, specific acoustic structures may be implemented in at least one of the first chamber 122 or the second chamber 123 to change the propagation speed of the first sound and the second sound within the chambers, thereby adjusting the phase difference between the first sound and the second sound. Examples of the specific acoustic structures include slow acoustic structures that slow down the sound propagation speed, such as an acoustic mesh and an acoustic porous material. Furthermore, at least one expansion acoustic structure (e.g., expansion chambers) may be implemented in at least one of the first chamber 122 or the second chamber 123 to change the equivalent propagation speed of the first sound and the second sound within the chambers, thus adjusting the phase difference between the first sound and the second sound. Similarly, at least one sound absorption structure (e.g., resonant chambers) may be implemented in at least one of the first chamber 122 or the second chamber 123 to modulate the sound near a resonance frequency of the sound absorption structures, thereby adjusting the phase difference between the first sound and the second sound. Further details regarding the specific description of controlling the phase difference between the first sound and the second sound by adjusting the acoustic structures of at least one of the first chamber 122 or the second chamber 123 may be found elsewhere in the present disclosure, such as in FIGS. 7A to 10B.

In some embodiments, when the count of the at least one acoustic driver 121 is two, the phase difference between the first sound and the second sound may also be adjusted through the phases of the electrical signals driving the two acoustic drivers 121.

In some embodiments, when the phase difference between the first sound and the second sound falls within a specific range (e.g., 120° to 179°), the sound radiated by the sound emitting part 120 towards a far field may exhibit directivity in at least part of a low-frequency range, such that the radiation field at the far field has only one direction with strong directivity (i.e., the sound pressure in and around the direction with strong directivity is sufficiently high) while the radiation intensity in other directions is relatively lower. In some embodiments, the sounds radiated from the first chamber 122 and the second chamber 123 may have a sound pressure difference of at least 15 dB in at least one pair of opposite directions (e.g., a direction towards the ear canal opening and a direction away from the ear canal opening) when a user wears the acoustic output device 100. In some embodiments, the sounds radiated from the first chamber 122 and the second chamber 123 may have a sound pressure difference of at least 13 dB in at least one pair of opposite directions. In some embodiments, the sounds radiated from the first chamber 122 and the second chamber 123 may have a sound pressure difference of at least 10 dB in at least one pair of opposite directions. In some embodiments, the sounds radiated from the first chamber 122 and the second chamber 123 may have a sound pressure difference of at least 8 dB in at least one pair of opposite directions. In some embodiments, the sounds radiated from the first chamber 122 and the second chamber 123 may have a sound pressure difference of at least 6 dB in at least one pair of opposite directions. In some embodiments, the sounds radiated from the first chamber 122 and the second chamber 123 may have a sound pressure difference of at least 5 dB in at least one pair of opposite directions. In some embodiments, the sounds radiated from the first chamber 122 and the second chamber 123 may have a sound pressure difference of at least 3 dB in at least one pair of opposite directions. In some embodiments, when the user wears the acoustic output device 100, the direction with strong directivity may be oriented towards the user's ear canal opening. Consequently, when the user wears the acoustic output device 100, the sound transmitted to the user's ear canal opening may be sufficiently loud while reducing sound leakage in other directions (e.g., the direction away from the ear canal opening), thereby improving the user's listening experience and privacy. In some embodiments, a technique for testing the sound pressure difference may involve placing a pair of measurement positions in opposite directions of the acoustic output device 100 (e.g., one position facing a direction of the first sound outlet and the other position facing away from the first sound outlet), Wherein, an acoustic center of the first sound outlet and an acoustic center of the second sound outlet have a same acquisition distance from a midpoint of a line connecting the acoustic centers to each acquisition position, and the acquisition distance is not less than 20 cm. A sound acquisition device is set at each of the two acquisition positions to acquire the sound pressures of the acoustic output device 100, and the difference between the two sound pressures is calculated as the sound pressure difference in at least one pair of opposite directions between the sound radiated from the first chamber 122 and the sound radiated from the second chamber 123.

It should be noted that the acoustic center of a sound outlet (e.g., the first sound outlet or the second sound outlet) may indicate an effective sound generation position of the sound outlet, which may be determined based on the shape, size, and quantity of the sound outlet. When there is only one sound outlet, the acoustic center may be the geometric center of the sound outlet (e.g., a centroid of the outer opening if the sound outlet has both an outer opening and an inner opening in a depth direction). When there are two sound outlets, the acoustic center may be a midpoint of a line connecting geometric centers of the two sound outlets. For example, when there are two first sound outlets, the acoustic center of the first sound outlet may be the midpoint of the line connecting the geometric centers of the two first sound outlets. When there are three sound outlets, the acoustic center may be a center of a circumscribed circle of geometric centers of the three sound outlets, or alternatively, it may be a centroid of a triangle formed by connecting the geometric centers of the three sound outlets. When there are four (or more) sound outlets, the acoustic center may be a centroid of a quadrilateral (or polygon) formed by connecting geometric centers of the four (or more) sound outlets.

In some embodiments, the distance between the first sound outlet and the second sound outlet may range from 2 mm to 60 mm. The distance between the first sound outlet and the second sound outlet refers to a distance between the acoustic center of the first sound outlet and the acoustic center of the second sound outlet. Taking the case where there is one first sound outlet and two second sound outlets as an example, the one first sound outlet and the two second sound outlets may form a triangle with three sides. The lengths of the three sides of the triangle may be measured, and based on the lengths of the three sides, the distance between the acoustic center of the first sound outlet and the acoustic center of the second sound outlet may be calculated (when there are two second sound outlets, the acoustic center may be the midpoint of the line connecting the geometric centers of the two sound outlets). For example, refer to FIG. 3C, where a geometric center A of a first sound outlet, a geometric center B1 of a second sound outlet, and a geometric center B2 of another second sound outlet form a triangle 300. The lengths of the three sides of the triangle 300 may be measured as a, b, and c, respectively. The acoustic center of the first sound outlet is the same as the geometric center A of the first sound outlet, and the acoustic centers of the two second sound outlets are the midpoints (denoted as B3) of the line connecting the geometric centers (B1 and B2) of the two sound outlets. The distance between the acoustic center of the first sound outlet and the acoustic center of the second sound outlet is a length of a line segment AB3 (denoted as x). A value of x may be calculated using the following formulas:

$$\cos\theta = -\cos(180^\circ - \theta), \tag{1}$$

$$\cos\theta = \frac{\left(\frac{c}{2}\right)^2 + x^2 - a^2}{2 \times \frac{c}{2} \times x}, \tag{2}$$

$$\cos(180^\circ - \theta) = \frac{\left(\frac{c}{2}\right)^2 + x^2 - b^2}{2 \times \frac{c}{2} \times x}, \tag{3}$$

wherein θ denotes an angle formed by the line segment AB3 and a line segment B1 B3.

According to the formulas (1)-(3), the value of x may be deduced and calculated as $$x = \sqrt{\frac{a^2 + b^2 - \frac{c^2}{2}}{2}}.$$

In some embodiments, in a low-frequency range, the phase difference between the first sound and the second sound may range from 120° to 179°. In some embodiments, in a low-frequency range, the phase difference between the first sound and the second sound may range from 125° to 170°. In some embodiments, in a low-frequency range, the phase difference between the first sound and the second sound may range from 130° to 165°. In some embodiments, in a low-frequency range, the phase difference between the first sound and the second sound may range from 135° to 160°. In some embodiments, in a low-frequency range, the phase difference between the first sound and the second sound may range from 140° to 155°. In some embodiments, in a low-frequency range, the phase difference between the first sound and the second sound may range from 170° to 179°. In some embodiments, in a low-frequency range, the phase difference between the first sound and the second sound may range from 176° to 179°. The low-frequency range refers to a range of frequencies below 1000 Hz.

In some embodiments, when the frequency is 1000 Hz, the phase difference between the first sound and the second sound may range from 125° to 178°. In some embodiments, when the frequency is 1000 Hz, the phase difference between the first sound and the second sound may range from 140° to 178°. In some embodiments, when the frequency is 1000 Hz, the phase difference between the first sound and the second sound may range from 160° to 178°. In some embodiments, when the frequency is 1000 Hz, the phase difference between the first sound and the second sound may range from 165° to 178°. In some embodiments, when the frequency is 1000 Hz, the phase difference between the first sound and the second sound may range from 170° to 178°. In some embodiments, when the frequency is 1000 Hz, the phase difference between the first sound and the second sound may range from 175° to 178°.

When the distance between the first sound outlet and the second sound outlet varies, the phase difference between the first sound and the second sound may be different. In some embodiments, the distance between the acoustic centers of the first sound outlet and the second sound outlet may range from 2 mm to 4 mm, and when the frequency is 1000 Hz, the phase difference between the first sound and the second sound may range from 174° to 178°. In some embodiments, the distance between the acoustic centers of the first sound outlet and the second sound outlet may range from 2 mm to 4 mm, and when the frequency is 1000 Hz, the phase difference between the first sound and the second sound may range from 175° to 178°. Furthermore, in some embodiments, the distance between the acoustic centers of the first sound outlet and the second sound outlet may range from 4 mm to 8 mm, and when the frequency is 1000 Hz, the phase difference between the first sound and the second sound may range from 170° to 177°. In some embodiments, the distance between the acoustic centers of the first sound outlet and the second sound outlet may range from 4 mm to 8 mm, and when the frequency is 1000 Hz, the phase difference between the first sound and the second sound may range from 169° to 176°. In some embodiments, the distance between the acoustic centers of the first sound outlet and the second sound outlet may range from 8 mm to 16 mm, and when the frequency is 1000 Hz, the phase difference between the first sound and the second sound may range from 162° to 173°. In some embodiments, the distance between the acoustic centers of the first sound outlet and the second sound outlet may range from 8 mm to 16 mm, and when the frequency is 1000 Hz, the phase difference between the first sound and the second sound may range from 163° to 172°. In some embodiments, the distance between the acoustic centers of the first sound outlet and the second sound outlet may range from 16 mm to 20 mm, and when the frequency is 1000 Hz, the phase difference between the first sound and the second sound may range from 158° to 165°. In some embodiments, the distance between the acoustic centers of the first sound outlet and the second sound outlet may range from 16 mm to 20 mm, and when the frequency is 1000 Hz, the phase difference between the first sound and the second sound may range from 159° to 164°.

In some embodiments, when the frequency is 200 Hz, the phase difference between the first sound and the second sound may be greater than 175° and less than 179.8°. In some embodiments, when the frequency is 200 Hz, the phase difference between the first sound and the second sound may be greater than 177° and less than 179.8°. In some embodiments, when the frequency is 200 Hz, the phase difference between the first sound and the second sound may be greater than 179° and less than 179.8°. In some embodiments, the distance between the acoustic centers of the first sound outlet and the second sound outlet may range from 2 mm to 20 mm, and when the frequency is 200 Hz, the phase difference between the first sound and the second sound may be greater than 175° and less than 179.8°. In some embodiments, the distance between the acoustic centers of the first sound outlet and the second sound outlet may range from 2 mm to 20 mm, and when the frequency is 200 Hz, the phase difference between the first sound and the second sound may be greater than 174° and less than 179.8°. In some embodiments, the distance between the acoustic centers of the first sound outlet and the second sound outlet may range from 2 mm to 10 mm, and when the frequency is 200 Hz, the phase difference between the first sound and the second sound may be greater than 176° and less than 179.8°. In some embodiments, the distance between the acoustic centers of the first sound outlet and the second sound outlet may range from 2 mm to 10 mm, and when the frequency is 200 Hz, the phase difference between the first sound and the second sound may be greater than 177.8° and less than 179.8°. In some embodiments, the distance between the acoustic centers of the first sound outlet and the second sound outlet may range from 2 mm to 4 mm, and when the frequency is 200 Hz, the phase difference between the first sound and the second sound may be greater than 177° and less than 179.8°. In some embodiments, the distance between the acoustic centers of the first sound outlet and the second sound outlet may range from 2 mm to 4 mm, and when the frequency is 200 Hz, the phase difference between the first sound and the second sound may be greater than 176° and less than 179.8°.

In some embodiments, when the frequency is 500 Hz, the phase difference between the first sound and the second sound may be in a range of 169° to 179°. In some embodiments, when the frequency is 500 Hz, the phase difference between the first sound and the second sound may be in a range of 174° to 179°. In some embodiments, when the frequency is 500 Hz, the phase difference between the first sound and the second sound may be in a range of 177° to 179°. In some embodiments, the distance between the acoustic centers of the first sound outlet and the second sound outlet may be in a range of 2 mm to 20 mm, and when the frequency is 500 Hz, the phase difference between the first sound and the second sound may be in a range of 169° to 179°. In some embodiments, the distance between the acoustic centers of the first sound outlet and the second sound outlet may be in a range of 2 mm to 20 mm, and when the frequency is 500 Hz, the phase difference between the first sound and the second sound may be in a range of 168° to 179°. In some embodiments, the distance between the acoustic centers of the first sound outlet and the second sound outlet may be in a range of 2 mm to 10 mm, and when the frequency is 500 Hz, the phase difference between the first sound and the second sound may be in a range of 175° to 179°. In some embodiments, the distance between the acoustic centers of the first sound outlet and the second sound outlet may be in a range of 2 mm to 10 mm, and when the frequency is 500 Hz, the phase difference between the first sound and the second sound may be in a range of 174° to 179°. In some embodiments, the distance between the acoustic centers of the first sound outlet and the second sound outlet may be in a range of 2 mm to 4 mm, and when the frequency is 500 Hz, the phase difference between the first sound and the second sound may be in a range of 177° to 179°. In some embodiments, the distance between the acoustic centers of the first sound outlet and the second sound outlet may be in a range of 2 mm to 4 mm, and when the frequency is 500 Hz, the phase difference between the first sound and the second sound may be in a range of 176° to 179°.

In some embodiments, when the frequency is 1500 Hz, the phase difference between the first sound and the second sound may be in a range of 149° to 177°. In some embodiments, when the frequency is 1500 Hz, the phase difference between the first sound and the second sound may be in a range of 164° to 177°. In some embodiments, when the frequency is 1500 Hz, the phase difference between the first sound and the second sound may be in a range of 173° to 177°. In some embodiments, the distance between the acoustic centers of the first sound outlet and the second sound outlet may be in a range of 2 mm to 20 mm, and when the frequency is 1500 Hz, the phase difference between the first sound and the second sound may be in a range of 149° to 177°. In some embodiments, the distance between the acoustic centers of the first sound outlet and the second sound outlet may be in a range of 2 mm to 20 mm, and when the frequency is 1500 Hz, the phase difference between the first sound and the second sound may be in a range of 148° to 178°. In some embodiments, the distance between the acoustic centers of the first sound outlet and the second sound outlet may be in a range of 2 mm to 10 mm, and when the frequency is 1500 Hz, the phase difference between the first sound and the second sound may be in a range of 164° to 177°. In some embodiments, the distance between the acoustic centers of the first sound outlet and the second sound outlet may be in a range of 2 mm to 10 mm, and when the frequency is 1500 Hz, the phase difference between the first sound and the second sound may be in a range of 163° to 178°. In some embodiments, the distance between the acoustic centers of the first sound outlet and the second sound outlet may be in a range of 2 mm to 4 mm, and when the frequency is 1500 Hz, the phase difference between the first sound and the second sound may be in a range of 173° to 177°. In some embodiments, the distance between the acoustic centers of the first sound outlet and the second sound outlet may be in a range of 2 mm to 4 mm, and when the frequency is 1500 Hz, the phase difference between the first sound and the second sound may be in a range of 172° to 178°.

In some embodiments, when the frequency is 2000 Hz, the phase difference between the first sound and the second sound may be in a range of 139° to 176°. In some embodiments, when the frequency is 2000 Hz, the phase difference between the first sound and the second sound may be in a range of 159° to 176°. In some embodiments, when the frequency is 2000 Hz, the phase difference between the first sound and the second sound may be in a range of 171° to 176°. In some embodiments, the distance between the acoustic centers of the first sound outlet and the second sound outlet may be in a range of 2 mm to 20 mm, and when the frequency is 2000 Hz, the phase difference between the first sound and the second sound may be in a range of 139° to 176°. In some embodiments, the distance between the acoustic centers of the first sound outlet and the second sound outlet may be in a range of 2 mm to 20 mm, and when the frequency is 2000 Hz, the phase difference between the first sound and the second sound may be in a range of 138° to 177°. In some embodiments, the distance between the acoustic centers of the first sound outlet and the second sound outlet may be in a range of 2 mm to 10 mm, and when the frequency is 2000 Hz, the phase difference between the first sound and the second sound may be in a range of 159° to 176°. In some embodiments, the distance between the acoustic centers of the first sound outlet and the second sound outlet may be in a range of 2 mm to 10 mm, and when the frequency is 2000 Hz, the phase difference between the first sound and the second sound may be in a range of 158° to 177°. In some embodiments, the distance between the acoustic centers of the first sound outlet and the second sound outlet may be in a range of 2 mm to 4 mm, and when the frequency is 2000 Hz, the phase difference between the first sound and the second sound may be in a range of 169° to 176°. In some embodiments, the distance between the acoustic centers of the first sound outlet and the second sound outlet may be in a range of 2 mm to 4 mm, and when the frequency is 2000 Hz, the phase difference between the first sound and the second sound may be in a range of 170° to 175°.

In some embodiments, when the frequency is 3000 Hz, the phase difference between the first sound and the second sound may be in a range of 121° to 174°. In some embodiments, when the frequency is 3000 Hz, the phase difference between the first sound and the second sound may be in a range of 149° to 174°. In some embodiments, when the frequency is 3000 Hz, the phase difference between the first sound and the second sound may be in a range of 167° to 174°. In some embodiments, the distance between the acoustic centers of the first sound outlet and the second sound outlet may be in a range of 2 mm to 20 mm, and when the frequency is 3000 Hz, the phase difference between the first sound and the second sound may be in a range of 121° to 174°. In some embodiments, the distance between the acoustic centers of the first sound outlet and the second sound outlet may be in a range of 2 mm to 20 mm, and when the frequency is 3000 Hz, the phase difference between the first sound and the second sound may be in a range of 120° to 175°. In some embodiments, the distance between the acoustic centers of the first sound outlet and the second sound outlet may be in a range of 2 mm to 10 mm, and when the frequency is 3000 Hz, the phase difference between the first sound and the second sound may be in a range of 149° to 174°. In some embodiments, the distance between the acoustic centers of the first sound outlet and the second sound outlet may be in a range of 2 mm to 10 mm, and when the frequency is 3000 Hz, the phase difference between the first sound and the second sound may be in a range of 148° to 175°. In some embodiments, the distance between the acoustic centers of the first sound outlet and the second sound outlet may be in a range of 2 mm to 4 mm, and when the frequency is 3000 Hz, the phase difference between the first sound and the second sound may be in a range of 167° to 174°. In some embodiments, the distance between the acoustic centers of the first sound outlet and the second sound outlet may be in a range of 2 mm to 4 mm, and when the frequency is 3000 Hz, the phase difference between the first sound and the second sound may be in a range of 166° to 175°.

In some embodiments, when the distance between the first sound outlet and the second sound outlet is determined, the phase difference between the first sound and the second sound may be within a specific range at a certain frequency band or value.

In some embodiments, at one of a plurality of frequency values within a frequency range of 500 Hz to 3000 Hz, the phase difference between the first sound and the second sound may be in a range of 121° to 179°. In some embodiments, the frequency values that result in the phase difference between 121° and 179° for the first sound and the second sound may include, but are not limited to, 500 Hz, 800 Hz, 1000 Hz, 1200 Hz, and 1500 Hz. In some embodiments, when the distance between the acoustic centers of the first sound outlet and the second sound outlet is in the range of 2 mm to 20 mm, and the frequency is one of 500 Hz, 800 Hz, 1000 Hz, 1200 Hz, or 1500 Hz, the phase difference between the first sound and the second sound may be in the range of 121° to 179°. In some embodiments, when the distance between the acoustic centers of the first sound outlet and the second sound outlet is in the range of 2 mm to 20 mm, and the frequency is any of 500 Hz, 800 Hz, 1000 Hz, 1200 Hz, or 1500 Hz, the phase difference between the first sound and the second sound may be in the range of 120° to 179°. In some embodiments, when the distance between the acoustic centers of the first sound outlet and the second sound outlet is in a range of 2 mm to 10 mm, and the frequency is any of 500 Hz, 800 Hz, 1000 Hz, 1200 Hz, or 1500 Hz, the phase difference between the first sound and the second sound may be in a range of 164° to 179°. In some embodiments, when the distance between the acoustic centers of the first sound outlet and the second sound outlet is in the range of 2 mm to 10 mm, and the frequency is any of 500 Hz, 800 Hz, 1000 Hz, 1200 Hz, or 1500 Hz, the phase difference between the first sound and the second sound may be in a range of 163° to 179°. In some embodiments, when the distance between the acoustic centers of the first sound outlet and the second sound outlet is in a range of 2 mm to 4 mm, and the frequency is any of 500 Hz, 800 Hz, 1000 Hz, 1200 Hz, or 1500 Hz, the phase difference between the first sound and the second sound may be in a range of 175° to 179°. In some embodiments, when the distance between the acoustic centers of the first sound outlet and the second sound outlet is in the range of 2 mm to 4 mm, and the frequency is any of 500 Hz, 800 Hz, 1000 Hz, 1200 Hz, or 1500 Hz, the phase difference between the first sound and the second sound may be in a range of 1740 to 1790.

In some embodiments, it may be possible to achieve a phase difference between the first sound and the second sound within the range of 121° to 179° by adjusting the distance between the first sound outlet and the second sound outlet in the frequency range of 500 Hz-3000 Hz. Similarly, in some embodiments, the distance between the acoustic centers of the first sound outlet and the second sound outlet may be in the range of 2 mm-20 mm, and the phase difference between the first sound and the second sound in the frequency range of 500 Hz-3000 Hz may be within the range of 121° to 179°. Additionally, in some embodiments, the distance between the acoustic centers of the first sound outlet and the second sound outlet may be in the range of 2 mm-20 mm, and the phase difference between the first sound and the second sound in the frequency range of 500 Hz-3000 Hz may be within the range of 120°~179°. Furthermore, in some embodiments, the distance between the acoustic centers of the first sound outlet and the second sound outlet may be in the range of 2 mm-10 mm, and the phase difference between the first sound and the second sound in the frequency range of 500 Hz-3000 Hz may be within the range of 164° to 179°. Similarly, in some embodiments, the distance between the acoustic centers of the first sound outlet and the second sound outlet may be in the range of 2 mm-10 mm, and the phase difference between the first sound and the second sound in the frequency range of 500 Hz-3000 Hz may be within the range of 163° to 179°. In addition, in some embodiments, the distance between the acoustic centers of the first sound outlet and the second sound outlet may be in the range of 2 mm-4 mm, and the phase difference between the first sound and the second sound in the frequency range of 500 Hz-1500 Hz may be within the range of 175° to 179°. In some embodiments, the distance between the acoustic centers of the first sound outlet and the second sound outlet may be in the range of 2 mm-4 mm, and the phase difference between the first sound and the second sound in the frequency range of 500 Hz-1500 Hz may be within the range of 174° to 179°. It should be noted that endpoints of the various distance ranges in the embodiments described in the present disclosure may overlap, but endpoints of the corresponding phase difference ranges are non-overlapping. This is primarily due to measurement errors that may occur in practical measurements.

It should be noted that in the embodiments described in the present disclosure, the phase of the sound radiated from the sound outlet may be measured at spatial positions located at a specific distance from the sound outlet (or the geometric center of the sound outlet). In some embodiments, the specific distance may range from 1 mm to 10 mm. The phase of the sound radiated from the sound outlet may be measured at the geometric center of the sound outlet. In some embodiments, the technique for testing the phase difference may involve separately measuring the phase of the sound radiated from the first sound outlet and the second sound outlet (referred to as the first sound and the second sound, respectively), and then calculating the phase difference between the first sound and the second sound. When testing the sound from the first sound outlet (or the second sound outlet), a barrier may be used to separate the first sound outlet and the second sound outlet to avoid interference from the second sound outlet (or the first sound outlet) during the test. Furthermore, the sound acquisition device may be placed at a distance not exceeding 10 mm from the first sound outlet (or the second sound outlet) to acquire the first sound, further avoiding interference from the second sound outlet (or the first sound outlet) during the test. When using the barrier to separate the first sound outlet and the second sound outlet for testing the sound from the first sound outlet (or the second sound outlet), the distance between the measurement position and the geometric center of the corresponding sound outlet should be within the specific distance range mentioned above (1 mm-10 mm). Merely by way of example, standard dimensions may be chosen for the barrier. For example, the length, width, and height of the barrier may be 1650 mm, 1350 mm, and 30 mm, respectively. Furthermore, when there are two or more first sound outlets (or second sound outlets), any one of two or more first sound outlets may be chosen for testing. For example, one first sound outlet and one second sound outlet located at a specific relative position (such as a minimum or a maximum relative distance) may be chosen, and a phase of the sound emitted by each of the first sound outlet and the second sound may be tested, followed by a calculation of the phase difference. Additionally, sound measurements within a specific frequency range (such as 500 Hz-3000 Hz) do not have to be achieved through an exhaustive manner but may be accomplished by setting a plurality (e.g., 20-30) of equidistant frequency sampling points with endpoints being the endpoints of the frequency range, and measuring the sound at each sampling point.

It should be noted that the low-frequency range described in the embodiments of the present disclosure may refer to a range of frequencies below 1000 Hz. The far field may refer to a spatial range with a distance from the sound emitting part 120 greater than twice the wavelength corresponding to a specified frequency (e.g., a specific frequency within the low-frequency range).

Figure 3A:
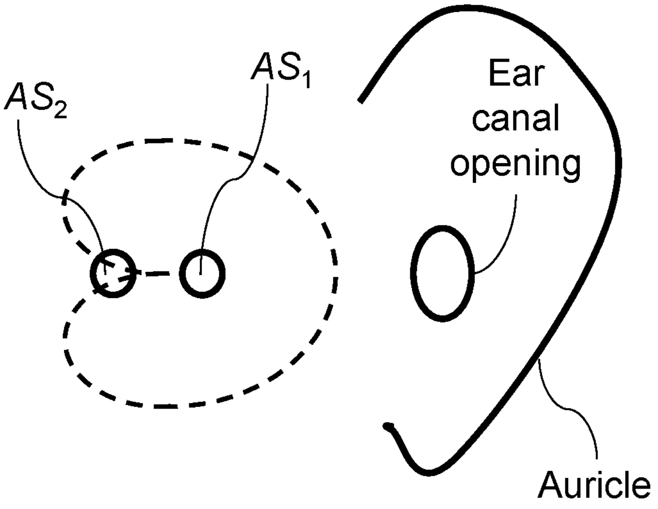
FIG. 3A is an exemplary schematic diagram illustrating the directional radiating sound field of the acoustic output device according to some embodiments of the present disclosure.
Figure 3B:
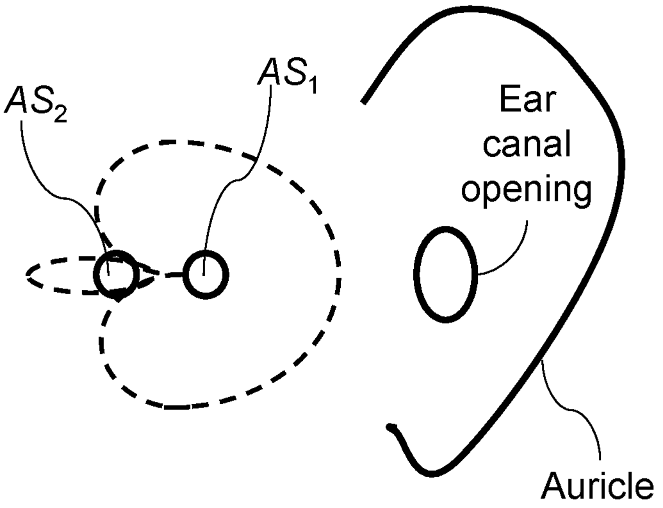
FIG. 3B is an exemplary schematic diagram illustrating the directional radiating sound field of the acoustic output device according to some embodiments of the present disclosure.
Figure 3C:
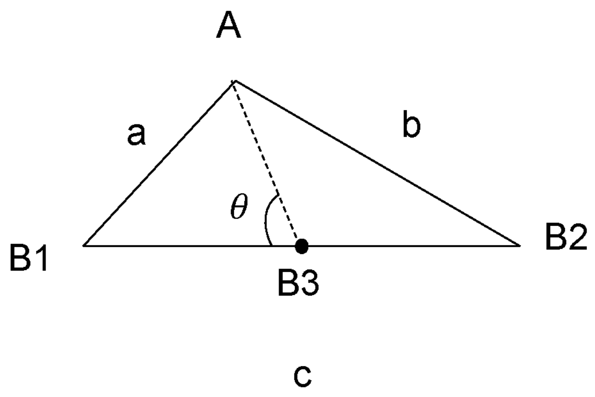
FIG. 3C is a schematic diagram illustrating a method for calculating a distance between acoustic centers according to some embodiments of the present disclosure.

FIGS. 3A and 3B are exemplary schematic diagrams illustrating a directional radiating sound field of an acoustic output device according to some embodiments of the present disclosure. As shown in FIGS. 3A and 3B, $AS_1$ and $AS_2$ represent a first sound source and a second sound source formed by the sound emitting part 120 of the acoustic output device 100, respectively. When a first sound generated by the first sound source and a second sound generated by the second sound source have a specific phase difference (e.g., 120° to 179°), the first sound source $AS_1$ and the second sound source $AS_2$ may form a radiated sound field with strong directivity, such as a cardioid directional radiated sound field (as shown in FIG. 3A) or a hyper-cardioid directional radiated sound field (as shown in FIG. 3B). It should be noted that a first sound outlet may constitute the first sound source, and a position of the first sound source may be considered as an acoustic center located at the first sound outlet.

Similarly, a second sound outlet may constitute the second sound source, and the position of the second sound source may be considered as an acoustic center located at the second sound outlet.

As shown in FIGS. 3A and 3B, it may be observed that the cardioid (FIG. 3A) or the hyper-cardioid (FIG. 3B) directional radiated sound field has only one main lobe, with strong sound field radiation in the vicinity of the main lobe, while sound field radiation in other directions is lower (sound field intensity in an opposite direction of the main lobe is relatively lower as well). When a user wears the acoustic output device 100, the main lobe may be directed towards the user's ear canal opening. In this case, only the radiation towards the ear canal opening and the vicinity of the ear canal opening is strong, while other directions exhibit weak directivity. Consequently, the sound leakage of the acoustic output device may be reduced. It should be understood that the phase difference between the first sound and the second sound in FIG. 3A and FIG. 3B is different (but within a specific range), resulting in a difference in the radiated sound field presented in FIG. 3A and FIG. 3B. The following describes a principle of forming the radiated sound field with strong directivity (such as the cardioid or the hyper-cardioid directional radiated sound field) with a specific phase difference between the first sound and the second sound.

Figure 4:
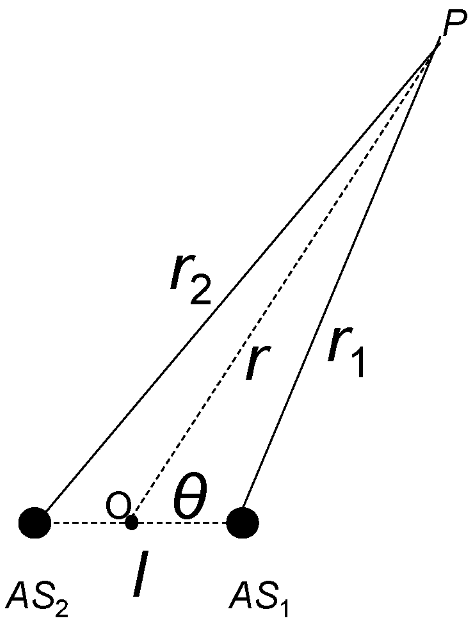
FIG. 4 is an exemplary schematic diagram illustrating radiation of dual sound sources according to some embodiments of the present disclosure.

FIG. 4 is an exemplary schematic diagram illustrating radiation of dual sound sources according to some embodiments of the present disclosure. As shown in FIG. 4, $AS_1$ and $AS_2$ represent two sound sources formed by the sound emitting part 120 of the acoustic output device 100, respectively. P represents a point in a far field, l represents a distance between the first sound source $AS_1$ and the second sound source $AS_2$, $r_1$ represents a distance from the first sound source $AS_1$ to the point P, $r_2$ represents a distance from the second sound source $AS_2$ to the point P, r represents a distance between a midpoint O of a line connecting the first sound source $AS_1$ and the second sound source $AS_2$ to the point P, and θ represents the angle between the line connecting the first sound source $AS_1$ and the second sound source $AS_2$ and a line connecting the midpoint O and the point P.

The sound pressure at the first sound source $AS_1$ and the second sound source $AS_2$ may be respectively expressed as:

$$\begin{cases} S_1 = \frac{A}{r_1} e^{j(\omega t - kr_1)} \\ S_2 = \frac{A}{r_2} e^{j(\omega t - kr_2 + \varphi)} \end{cases}, \tag{4}$$

wherein φ represents a phase difference between the first sound source $AS_1$ and the second sound source $AS_2$, and k represents a wave vector. Under a far field condition (r>>I, kl<<1), the distances $r_1$ and $r_2$ may be expressed as:

$$\begin{cases} r_1 = r - \frac{l}{2}\cos\theta \\ r_2 = r + \frac{l}{2}\cos\theta \end{cases}. \tag{5}$$

Therefore, a sound pressure amplitude |p| at the far field point P may be represented as a superposition of the sound fields generated by the first sound source $AS_1$ and the second sound source $AS_2$ according to the following formula:

$$|p| = |S_1 + S_2| = \left|\frac{A}{r} e^{j(\omega t - kr)}\left(e^{j\frac{kl}{2}\cos\theta} + e^{-j\frac{kl}{2}\cos\theta} e^{j\varphi}\right)\right| = G\sqrt{\left(\frac{(kl)^2}{2} - \frac{(kl)^2}{2}\cos\varphi\right)\cos^2\theta + (2kl\sin\varphi)\cos\theta + (2 + 2\cos\varphi)}. \tag{6}$$

When a cardioid directional radiated sound field is desired, i.e., when 6=180°, the sound pressure amplitude |p| at a point P in the far field exhibits a minimum value. A derivative of |p| is obtained according to the following formula:

$$|p|'_{\theta=180^\circ} = 2\cos\theta\left[\frac{(kl)^2}{2} - \frac{(kl)^2}{2}\cos\varphi\right] + [2kl\sin\varphi] = 0. \tag{7}$$

By solving the above formula (7), a relationship that a phase difference φ between the first sound source $AS_1$ and the second sound source $AS_2$ needs to satisfy is obtained according to the following formula:

$$\cos\varphi = \frac{(kl)^2 - 4}{(kl)^2 + 4}. \tag{8}$$

From the formula (8), it is known that in order for t the first sound source $AS_1$ and the second sound source $AS_2$ to form the cardioid directional radiated sound field, the phase difference φ between the two sound sources needs to satisfy a certain relationship with kl. Since the wave vector k is related to the frequency f, the phase difference φ between the two sound sources is also related to the frequency.

Figure 5:
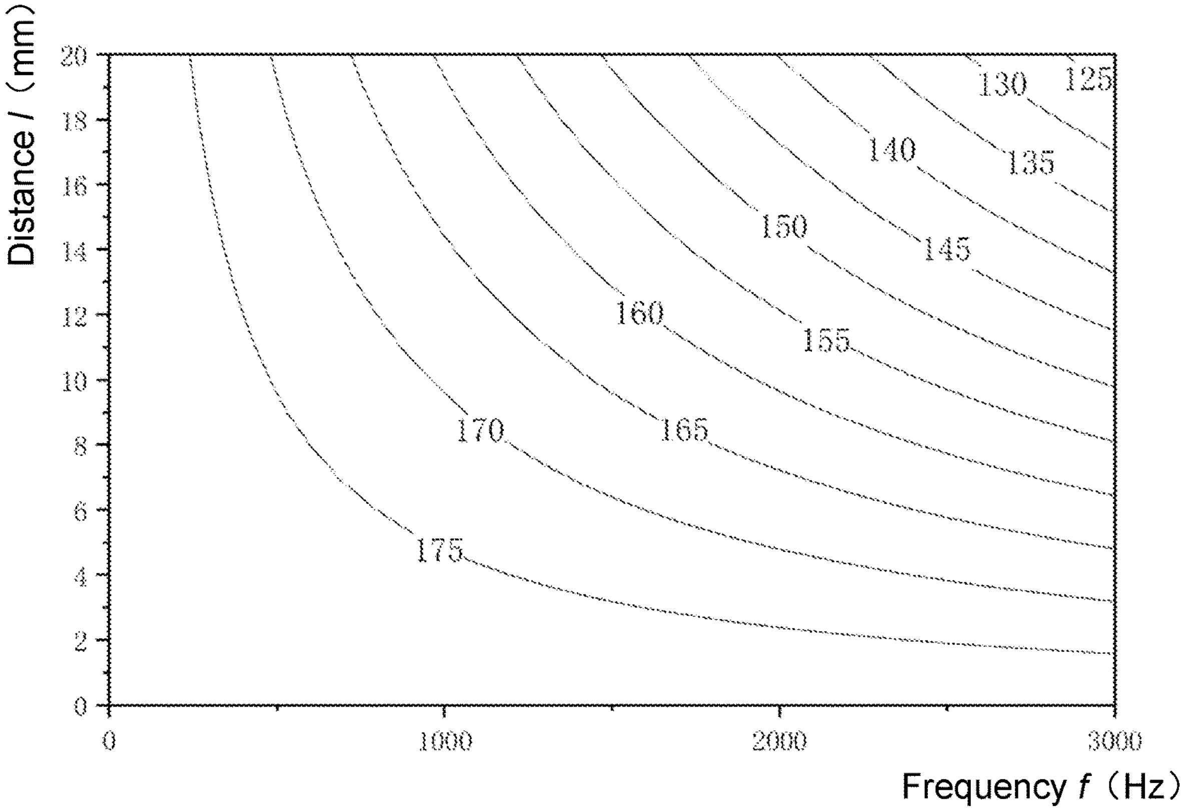
FIG. 5 is a schematic diagram illustrating a relationship between a phase difference φ between a first sound source AS1 and a second sound source AS2, a frequency f, and a distance l corresponding to a Formula (5)

FIG. 5 is a schematic diagram illustrating a relationship between the phase difference φ between the first sound source $AS_1$ and the second sound source $AS_2$, the frequency f, and the distance l corresponding to the formula (8). As shown in FIG. 5, a horizontal axis represents the frequency f in Hz, and a vertical axis represents the distance l between the two sound sources in millimeter. Each curve represents a required phase difference φ under a certain condition (i.e., a certain frequency f and a certain distance l). By comparing the curves in FIG. 5, it is observed that to achieve a cardioid directional radiated sound field, when the distances l is the same, the phase difference between the first sound source $AS_1$ and the second sound source $AS_2$ is inversely correlated with frequency within a specified frequency range. For example, within a range of 200 Hz-2000 Hz, as the frequency increases, the required phase difference between $AS_1$ and $AS_2$ decreases, and as the frequency decreases, the required phase difference increases. Similarly, when the frequencies are the same, the phase difference between $AS_1$ and $AS_2$ is inversely correlated with the distance between the two sound sources. A larger distance results in a smaller required phase difference, while a smaller distance results in a larger required phase difference.

In practical applications, the distance l is typically fixed, and the correspondence between the phase difference φ and kl may be simplified as a correspondence between the frequency and the phase difference. This means that, under the assumption of a fixed distance l, when the phase difference between the first sound source $AS_1$ and the second sound source $AS_2$ corresponds to the frequency according to a certain relationship, cardioid directional radiated sound field may be formed between $AS_1$ and $AS_2$. As an illustrative example, when the distance l is 3 mm, a corresponding table of the required phase difference φ (or an optimal phase difference for achieving cardioid directional radiated sound field) and the frequency f may be as follows:

| Frequency f | 200 Hz | 500 Hz | 1000 Hz | 2000 Hz |
|---|---|---|---|---|
| Phase difference φ | 179° | 178° | 176° | 173° |

From the table, it is seen that at different frequencies, the required phase difference φ between the first sound source $AS_1$ and the second sound source $AS_2$ for forming the cardioid directional radiated sound field varies. At the same time, the table also shows that even though the phase differences p corresponding to different frequencies are not the same, the differences are not significant. For example, the phase difference shown in the table for 200 Hz is 179°, while for 2000 Hz it is 173°, resulting in a difference of only 6° between the two. Therefore, when a fixed phase difference φ (such as 176°) or a range of phase differences (such as 120° to 179°) is determined, within a wide frequency range (such as 200 Hz to 2000 Hz), even if the cardioid directional radiated sound field (as shown in FIG. 3A) may not be achieved at certain frequencies, a cardioid-like directional radiated sound field may still be formed, such as a super cardioid directional radiated sound field shown in FIG. 3B.

Figure 6:
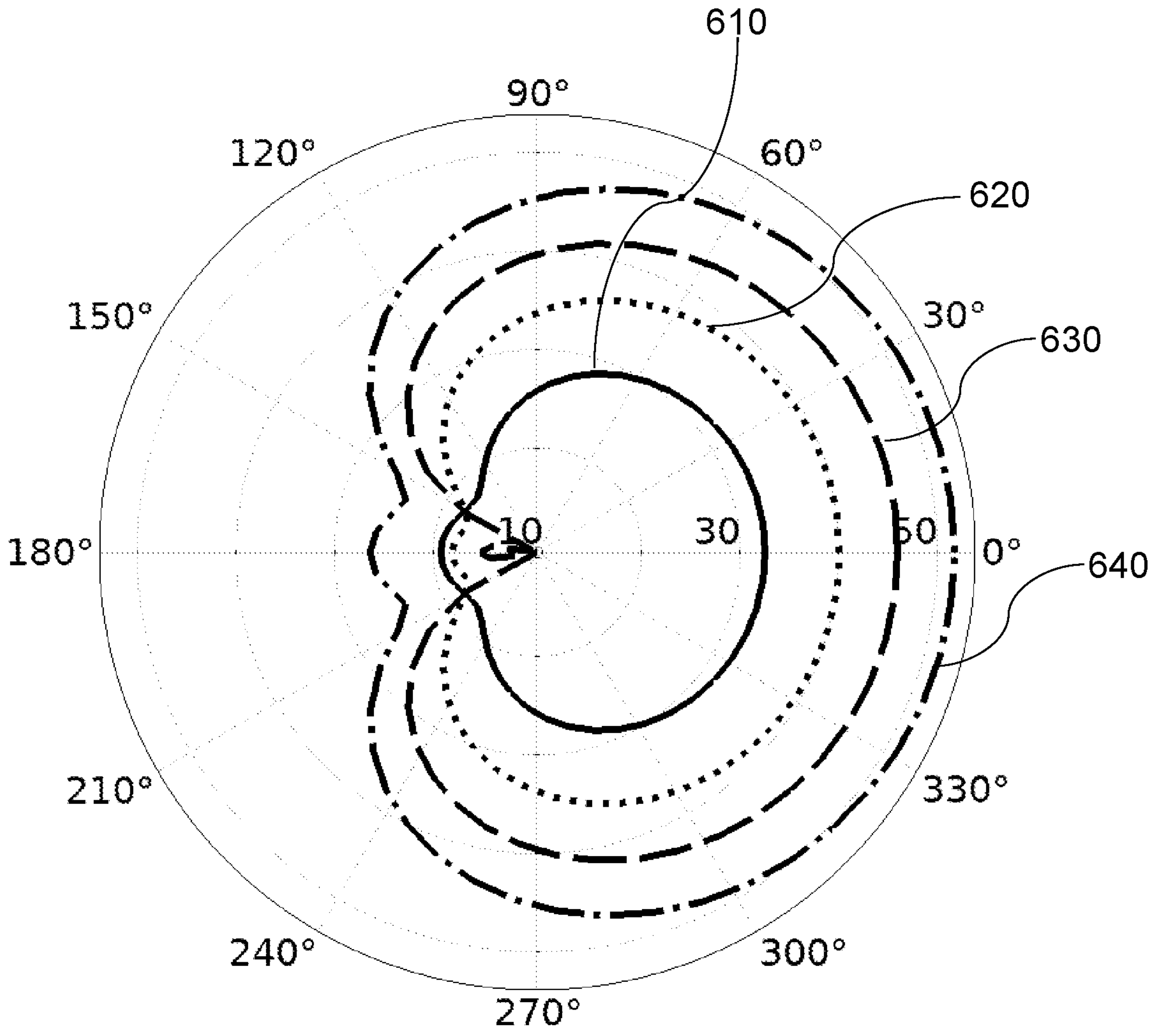
FIG. 6 is an exemplary schematic diagram illustrating directional radiating sound fields at different frequencies according to some embodiments of the present disclosure.

FIG. 6 is an exemplary schematic diagram illustrating directional radiating sound fields at different frequencies according to some embodiments of the present disclosure.

It should be noted that FIG. 6 corresponds to sound field radiation at different frequencies in a far field at a distance of 0.5 m from a sound source(s) when the distance l=3 mm and the phase difference φ=176°. As shown in FIG. 6, curves 610, 620, 630, and 640 represent directional radiation sound field curves corresponding to frequencies of 200 Hz, 500 Hz, 1000 Hz, and 2000 Hz, respectively, under far field conditions. From FIG. 6, it is observed that curve 630 has a lowest sound field intensity in an opposite direction (180° direction) of a main lobe (with a highest sound field intensity) of the radiated sound field, therefore, the sound field radiation directivity (cardioid directivity) of the curve 630 is optimal with respect to the other three curves (i.e., the directional radiated sound field is optimal when the phase difference φ is 176° and the frequency is 1000 Hz). The radiation sound fields corresponding to curves 610, 620, and 640 have slightly higher sound intensities in a direction opposite to the main lobe compared to the curve 630, forming cardioid-like directional radiated sound fields. Therefore, it may be concluded that within a frequency range of 200 Hz to 2000 Hz, when the phase difference is φ=176°, two sound sources may generate radiated sound fields with strong directivity. Furthermore, combining the previous description (the difference in optimal phase differences corresponding to different frequencies is not significant), it may be inferred that within a certain range of phase differences, such as 120° to 179°, two sound sources may also generate radiated sound fields with strong directivity within the frequency range of 200 Hz to 2000 Hz.

In some embodiments, since the far field conditions may be constrained as kl <<1 (and r>>l), and the magnitude of the wave vector (k) is inversely related to a wavelength, the wave vector may not be too large, meaning the wavelength may not be too small, i.e., the frequency may not be too high, in order to satisfy the far field conditions. Based on this, the frequency range in which the two sound sources described in the embodiments of the present disclosure may generate radiated sound fields with strong directivity is predominantly in a low-frequency range (e.g., less than 1000 Hz).

Figure 7A:
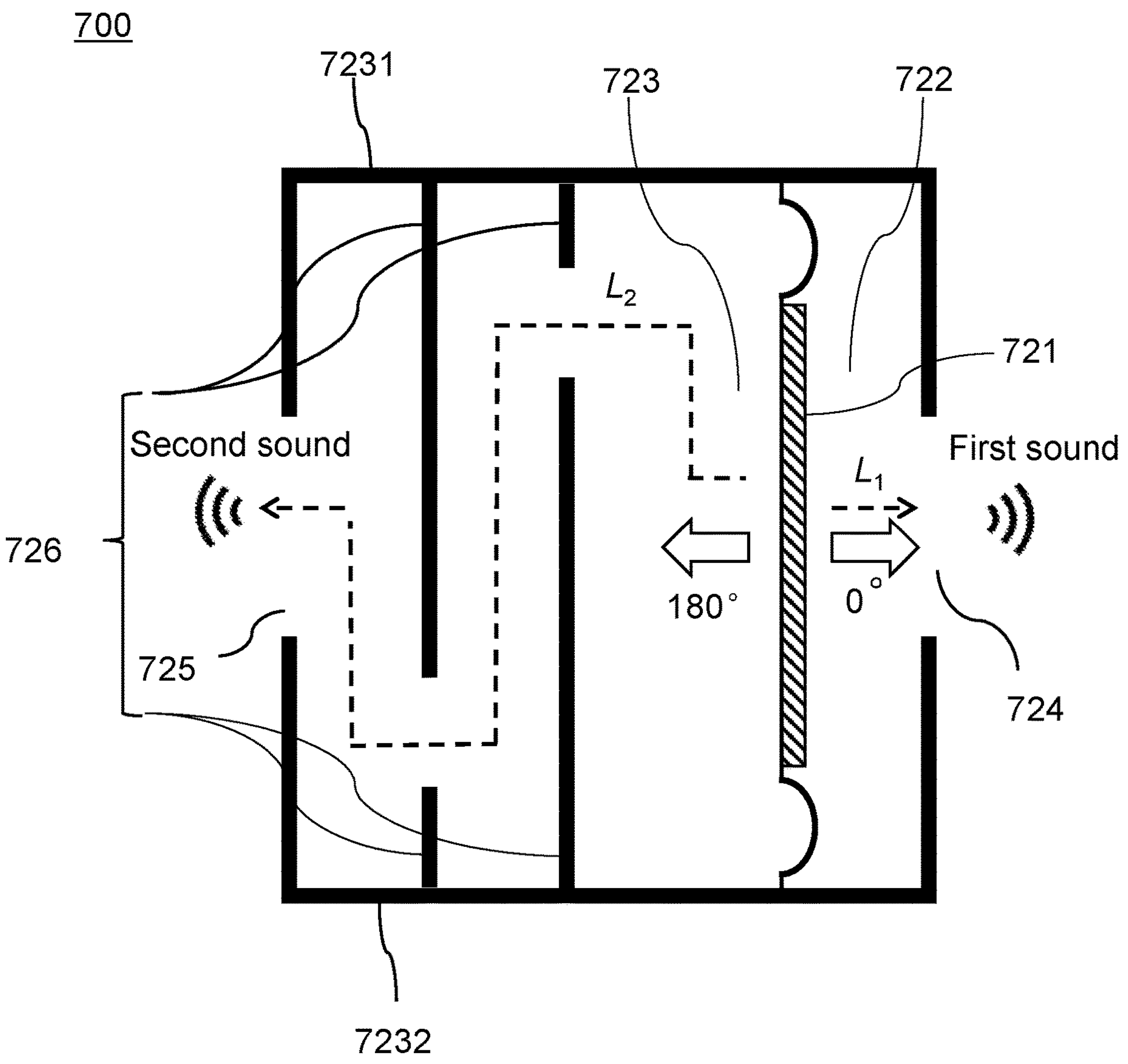
FIG. 7A is an exemplary schematic diagram illustrating an exemplary sound emitting part according to some embodiments of the present disclosure.

FIG. 7A is an exemplary schematic diagram illustrating an exemplary sound emitting part according to some embodiments of the present disclosure. As shown in FIG. 7A, a sound emitting part 700 may include at least one acoustic driver 721, a first chamber 722, and a second chamber 723. The first chamber 722 and the second chamber 723 are located on the front and rear sides of the acoustic driver 721, respectively. The first chamber 722 may have at least one first sound outlet 724, and the second chamber 723 may have at least one second sound outlet 725. A count of the first sound outlet(s) 724 and second sound outlet(s) 725 may be one or more, and the count of the sound outlets may be set reasonably according to requirements. The acoustic driver 721 may radiate a first sound to the outside through the first chamber 722 and the first sound outlet 724, as well as radiate a second sound to the outside through the second chamber 723 and the second sound outlet 725. In some embodiments, the at least one acoustic driver 721 may be a single acoustic driver. For example, the acoustic driver 721 shown in FIG. 7A may include a diaphragm that vibrates and radiates sounds to both sides of the diaphragm, i.e., to the first chamber 722 and the second chamber 723. In some embodiments, the at least one acoustic driver 721 may also include two acoustic drivers (i.e., the diaphragm in FIG. 7A may be replaced with two acoustic drivers), and the two acoustic drivers are driven by two sets of electrical signals to radiate sounds to the first chamber 722 and the second chamber 723, respectively. A sound inside the first chamber 722 may be radiated to the outside through the first sound outlet 724, i.e., the first sound outlet 724 radiates a first sound to the outside. A sound inside the second chamber 723 may be radiated to the outside through the second sound outlet 725, i.e., the second sound outlet 725 radiates a second sound to the outside.

Figure 7B:
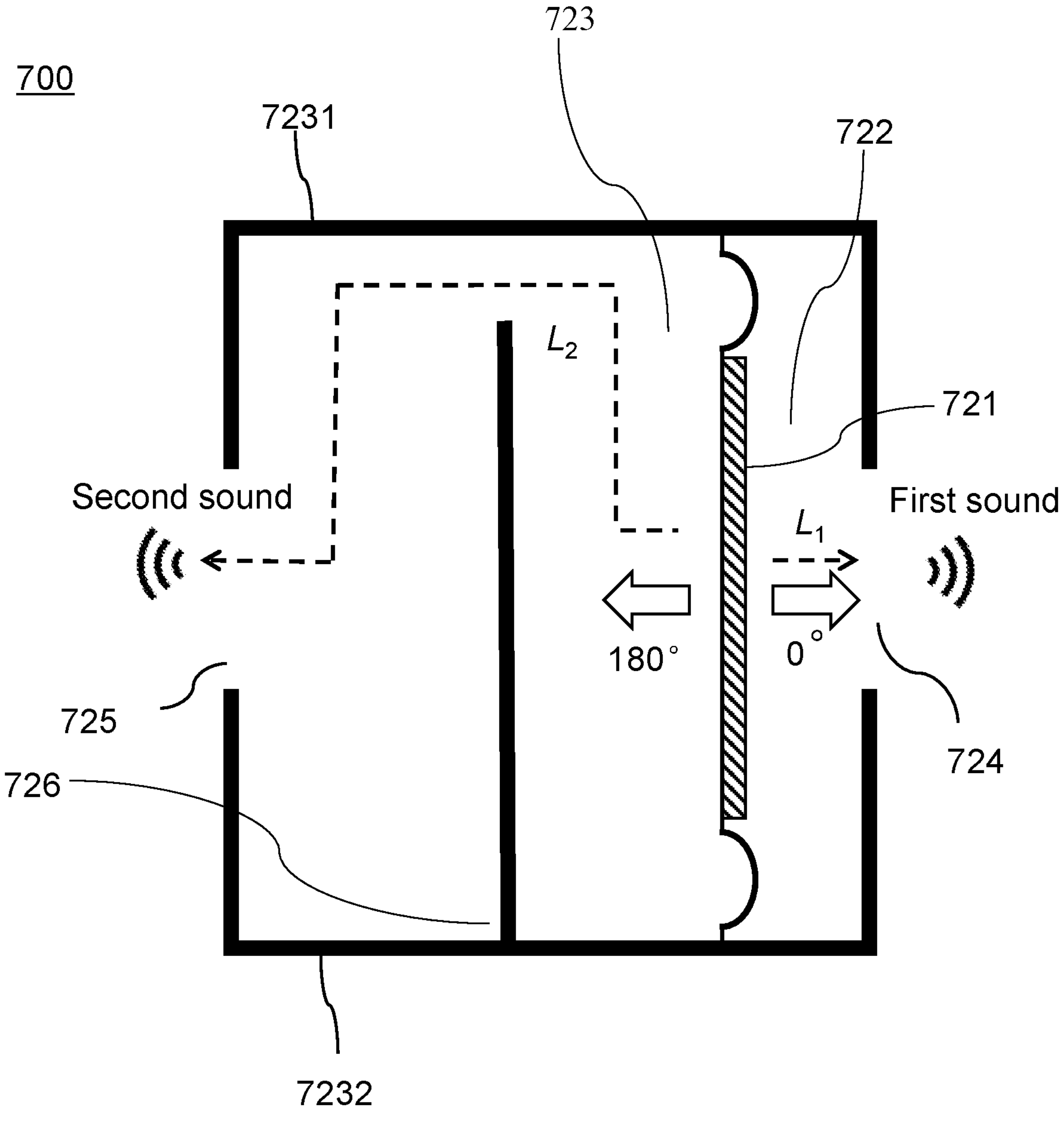
FIG. 7B is an exemplary schematic diagram illustrating the exemplary sound emitting part according to other embodiments of the present disclosure.
Figure 7C:
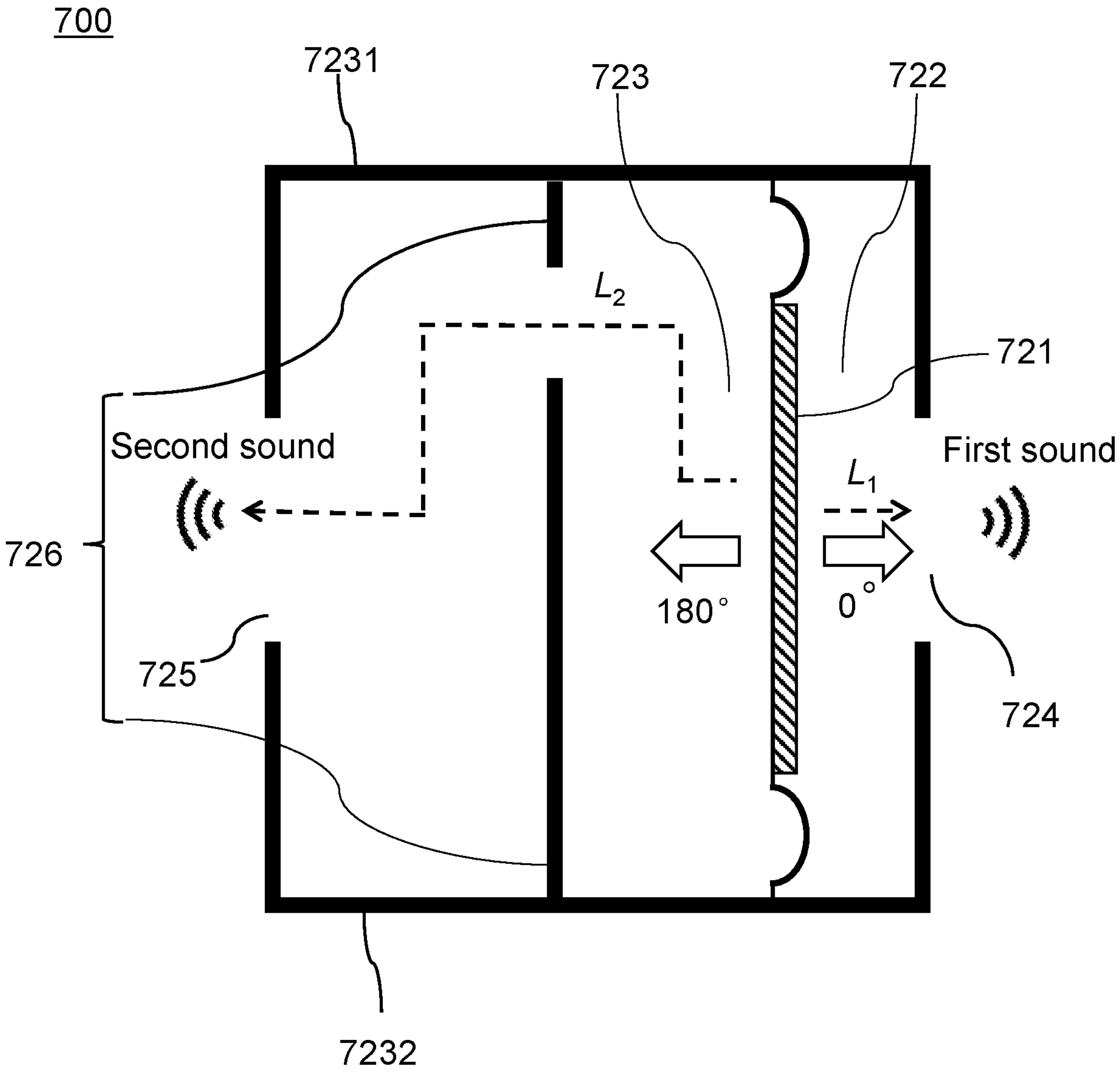
FIG. 7C is an exemplary schematic diagram illustrating the exemplary sound emitting part according to still other embodiments of the present disclosure.

In some embodiments, in order to achieve strong directivity (e.g., cardioid or super-cardioid) of the sound radiated by the sound emitting part 700 in a low-frequency range (e.g., below 1000 Hz) towards a far field, it is necessary to ensure that a phase difference between the first sound radiated from the first sound outlet 724 and the second sound radiated from the second sound outlet 725 is within a specific range (e.g., 120° to 179°). Since an initial phase difference of the two sound waves radiated from the acoustic driver 721 to the first chamber 722 and the second chamber 723 is 180°, it is necessary to configure an acoustic structure 726 inside at least one of the first chamber 722 or the second chamber 723 to satisfy a phase difference requirement between the first sound and the second sound. In some embodiments, the sound emitting part 700 may include the acoustic structure 726 set inside at least one of the first chamber 722 or the second chamber 723. The acoustic structure 726 may be configured to control (an) actual output phase(s) of at least one of the first sound or the second sound, thereby adjusting the phase difference between the first sound and the second sound. In some embodiments, the acoustic structure 726 may introduce a path difference between the first sound propagating in the first chamber 722 and the second sound propagating in the second chamber 723, thereby altering the phase difference between the first sound radiated from the first sound outlet 724 and the second sound radiated from the second sound outlet 725. The embodiment explains a set of the acoustic structure 726 in the second chamber 723, but it should be understood that in other alternative embodiments, the acoustic structure 726 may also be set in the first chamber 722, or different acoustic structures may be set in the first chamber 722 and the second chamber 723. In some embodiments, the acoustic structure 726 may include one or more baffles, where one end of each baffle is connected to the inner wall of the second chamber 723, and the other end is a free end. In some embodiments, as shown in FIG. 7A, four baffles may be set in the second chamber 723, with two baffles positioned on a first inner wall 7231 of the second chamber 723 and the remaining two baffles positioned on a second inner wall 7232 (opposite to the first inner wall 7231), with the free ends of the baffles on the two inner walls positioned opposite to each other, creating a gap between the free ends of the baffles. The sound may bypass the baffles and pass through the gap to reach the second sound outlet 725. In some embodiments, at least one of a count of the baffles or positions of the baffles in the second chamber 723 may be set differently. For example, as shown in FIG. 7B, the baffle may be set only on one inner wall (e.g., the second inner wall 7232) of the second chamber 723, where one end of the baffle is connected to the second inner wall 7232, and the free end of the baffle extends near the first inner wall 7231 (creating a gap between the free end of the baffle and the first inner wall 7231), allowing sound to bypass the baffle and pass through the gap to reach the second sound outlet 725. Another example, as shown in FIG. 7C, is that both ends of the baffle are connected to the first inner wall 7231 and the second inner wall 7232, respectively, and openings may be made in the baffle, allowing sound to bypass the baffle and pass through the openings to reach the second sound outlet 725. During the process of sound bypassing the baffle and traveling to the second sound outlet 725, a path traveled by the sound (i.e., a sound path) is altered compared to when no baffles are present. A sound wave radiated by the front side of the acoustic driver 721 propagates through the first chamber 722 and is emitted to the outside through the first sound outlet 724, following a first sound path $L_1$. A sound wave radiated by the rear side of the acoustic driver 721 passes through the second chamber 723 and the acoustic structure 726 before being emitted to the outside through the second sound outlet 725, following a second sound path $L_2$. There exists a path difference between the first sound path $L_1$ and the second sound path $L_2$.

A time delay of a phase difference between the first sound radiated from the first sound outlet 724 and the second sound radiated from the second sound outlet 725 may be expressed as:

$$\Delta\tau = \frac{L_2 - L_1}{c}, \tag{9}$$

Wherein c represents the speed of sound. Consequently, the phase difference φ between the first sound and the second sound may be determined according to the following formula:

$$\varphi = 180° - 2\pi f \cdot \Delta\tau. \tag{10}$$

Therefore, it may be understood that by controlling the path difference between the first sound path $L_1$ and the second sound path $L_2$ (for example, within a range of 1 mm to 57 mm), the actual output phase difference between the first sound and the second sound may be controlled, thus enabling the phase difference between the first sound and the second sound to be within a range of 120° to 179°, thereby achieving strong directivity (such as cardioid or super-cardioid pattern) in the sound radiated by the sound emitting part 700.

It should be noted that a count, position, size, and configuration of the baffles may influence the second sound path $L_2$ traveled by the sound wave within the second chamber 723, thus affecting the phase difference between the first sound and the second sound. Therefore, the count, position, size, and configuration of the baffles may be adjusted accordingly to meet the requirements for the phase difference between the first sound and the second sound.

Furthermore, in the embodiment, it may be observed that, the phase difference between the first sound and the second sound is inversely correlated with frequency, provided that the other parameters (such as the first sound path and the second sound path) are the same. As the frequency increases, the phase difference between the first sound and the second sound decreases, and as the frequency decreases, the phase difference increases.

Figure 8:
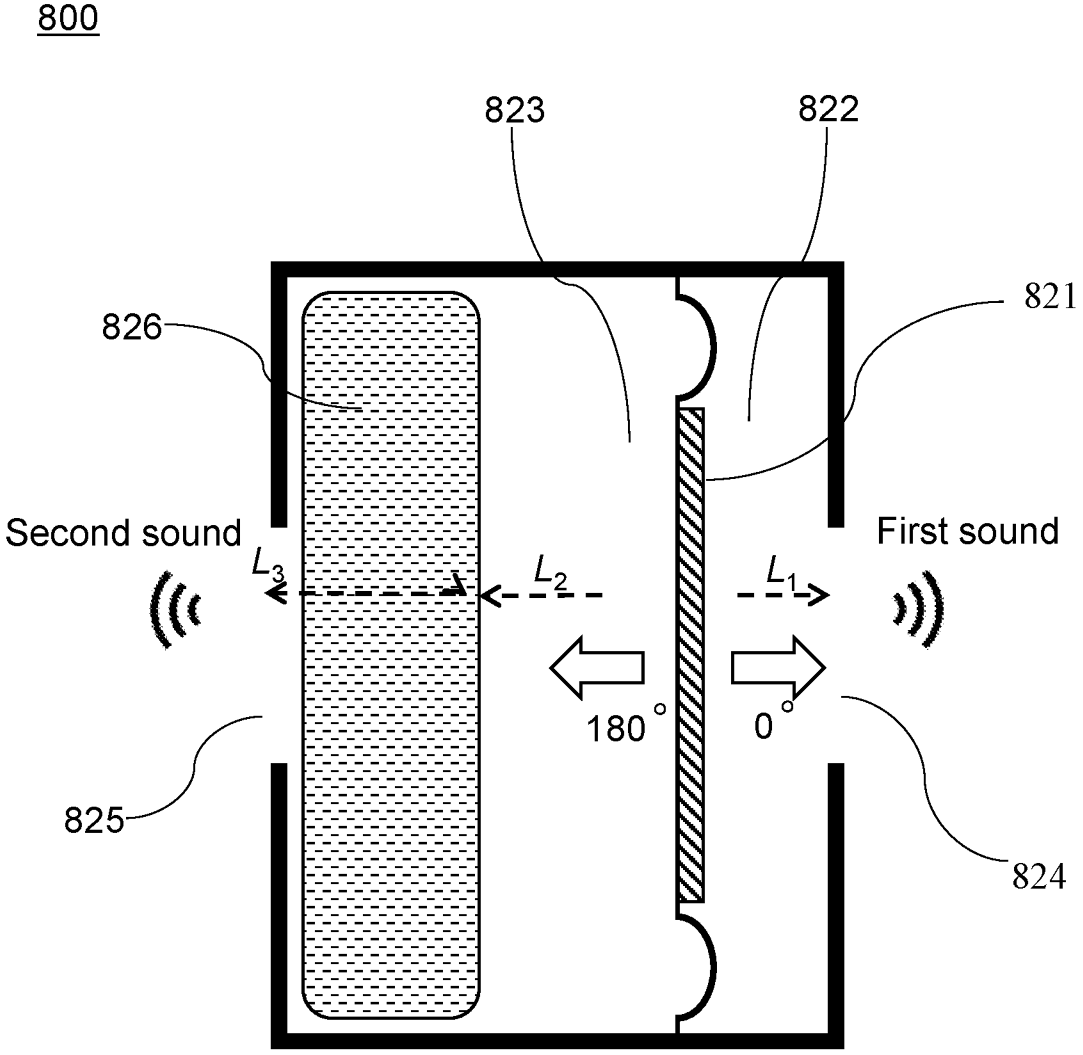
FIG. 8 is an exemplary schematic diagram illustrating another exemplary sound emitting part according to some embodiments of the present disclosure.

FIG. 8 is an exemplary schematic diagram illustrating another exemplary sound emitting part according to some embodiments of the present disclosure. A structure of a sound emitting part 800 shown in FIG. 8 is similar to the structure of the sound emitting part 700 shown in FIG. 7A. For example, the sound emitting part 800 may include at least one acoustic driver 821, a first chamber 822, and a second chamber 823. The first chamber 822 may have at least one first sound outlet 824, and the second chamber 823 may have at least one second sound outlet 825. Specific details regarding the acoustic driver 821, the first chamber 822, the second chamber 823, the first sound outlet 824, and the second sound outlet 825 may be found in the corresponding description of FIG. 7A. The difference between the sound emitting part 800 and the sound emitting part 700 lies in different acoustic structures. At least one of the first chamber 822 or the second chamber 823 of the sound emitting part 800 may contain acoustic structure(s) that alter the speed of sound propagation. For example, the acoustic structure may be a slow acoustic structure that slows down the speed of sound transmission within the slow acoustic structure. The speed of sound propagation in air is faster than the speed of sound propagation in the slow acoustic structure. In some embodiments, the slow acoustic structure may include an acoustic mesh, an acoustic porous material, or other similar components. When sound waves pass through micro-holes in the mesh or the porous material, the viscosity of the air in the micro-holes slows down the speed of sound, resulting in a desired slow effect. Specifically, the speed of sound propagation in the air (also known as the normal speed of sound) is c, and the speed of sound propagation in the slow acoustic structure (also known as the equivalent speed of sound) is c'. From the above description, it may be deduced that $c'<c$. Therefore, by incorporating the slow acoustic structure in the chamber, the speed of sound transmission may be controlled, thereby adjusting the actual output phase of at least one of the first sound or the second sound, and consequently adjusting the phase difference between the first sound and the second sound.

In the embodiment, an example is given where a slow acoustic structure 826 is located in the second chamber 823, as shown in FIG. 8. Sound waves radiated from the front of the acoustic driver 821 propagate through the first sound outlet 824 to the outside, covering the first sound path $L_1$. Sound waves radiated from the rear of the acoustic driver 821 propagate through the second sound outlet 825 to the outside, and this sound path includes the second sound path $L_2$, which propagates through the air, and the third sound path $L_3$, which propagates through the slow acoustic structure 826.

A time delay of the phase difference between the first sound radiated from the first sound outlet 824 and the second sound radiated from the second sound outlet 825 may be expressed as:

$$\Delta\tau = \left(\frac{L_2}{c} + \frac{L_3}{c'}\right) - \frac{L_1}{c}, \tag{11}$$

Wherein, c represents the normal speed of sound and c' represents the equivalent speed of sound in the slow acoustic structure 826. Therefore, the phase difference φ between the first sound and the second sound may be calculated as:

$$\varphi = 180^\circ - 2\pi f \cdot \Delta\tau. \tag{12}$$

Therefore, it may be understood that the actual output phase difference between the first sound and the second sound may be controlled by adjusting at least one of the equivalent speed of sound in the slow acoustic structure 826 or the third sound path $L_3$. For example, by ensuring that a ratio of the equivalent speed of sound in the slow acoustic structure to the normal speed of sound is within a range of 0.02 to 0.5, the phase difference between the first sound and the second sound may be adjusted to be within the range of 120° to 179°. This allows the sound radiated by the sound emitting part 800 to exhibit strong directivity, such as a cardioid or a hyper-cardioid pattern.

Additionally, in the embodiment, it may be observed that the phase difference between the first sound and the second sound is inversely correlated with the frequency provided that other parameters (such as the equivalent speed of sound, the first sound path, the second sound path, and the third sound path) are the same. The higher the frequency, the smaller the phase difference between the first sound and the second sound, and the lower the frequency, the greater the phase difference between the first sound and the second sound.

Figure 9:
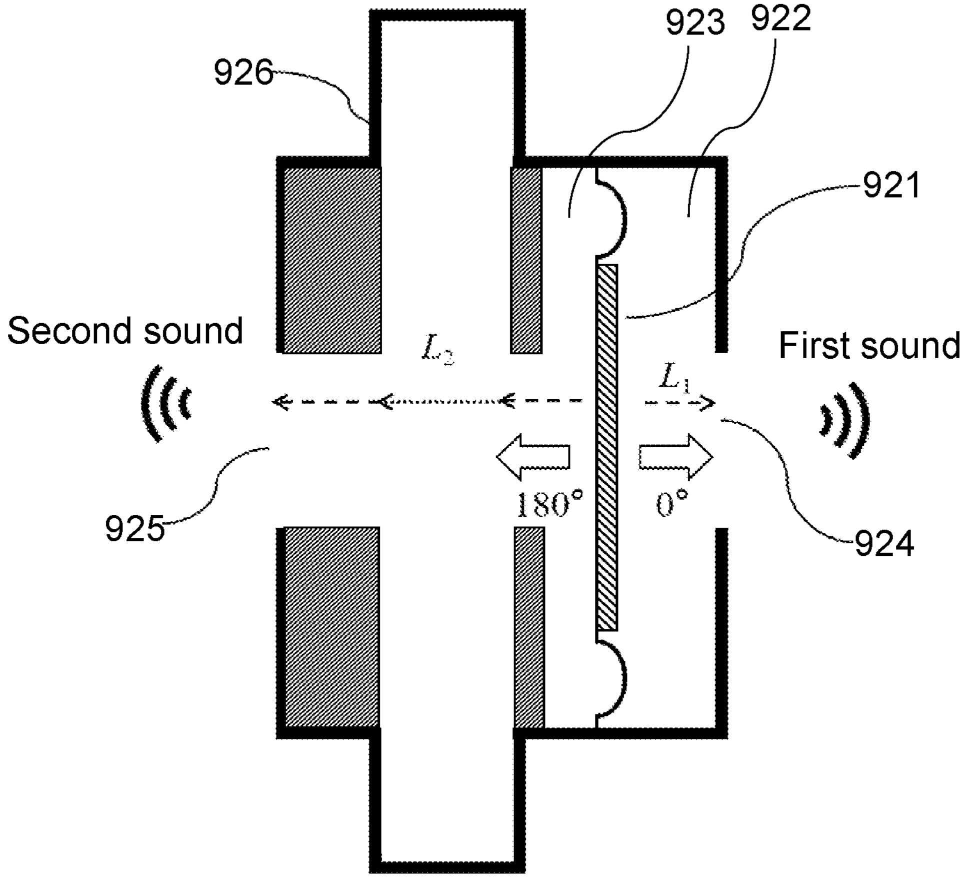
FIG. 9 is an exemplary schematic diagram illustrating still another exemplary sound emitting part according to some embodiments of the present disclosure.

FIG. 9 is an exemplary schematic diagram illustrating still another exemplary sound emitting part according to some embodiments of the present disclosure. A structure of a sound emitting part 900 shown in FIG. 9 is similar to that of the sound emitting part 700 shown in FIG. 7A. For example, the sound emitting part 900 may include at least one acoustic driver 921, a first chamber 922, and a second chamber 923. The first chamber 922 may have at least one first sound outlet 924, and the second chamber 923 may have at least one second sound outlet 925. For specific details regarding the acoustic driver 921, the first chamber 922, the second chamber 923, the first sound outlet 924, and the second sound outlet 925, please refer to the relevant description in FIG. 7A. The difference between the sound emitting part 900 and the sound emitting part 700 lies in differences in acoustic structure(s). As shown in FIG. 9, at least one of the first chamber 922 or the second chamber 923 of the sound emitting part 900 may be equipped with an expansion acoustic structure 926. The expansion acoustic structure 926 may change (e.g., enlarge) a cross-sectional area of the first chamber 922 or the second chamber 923 at different positions along a sound transmission path. When sound waves propagate in a waveguide (i.e., an airwave guide formed by the first chamber 922 or the second chamber 923), if the cross-sectional area of the waveguide at different positions along the sound transmission path changes, the sound waves will be reflected at a location of an abrupt change in a cross-sectional area. This means that an equivalent impedance of the medium has changed. Consequently, parameters associated with the equivalent impedance (such as equivalent sound speed, equivalent density, etc.) also change, resulting in a change in phases of the sound waves. For example, the influence of the expansion acoustic structure 926 on the change in the equivalent sound speed primarily depends on a ratio of the cross-sectional area of an expanded second chamber 923 to the original cross-sectional area of the second chamber 923. In some embodiments, an actual equivalent sound speed may be obtained through simulations or experimental tests.

In the embodiment, the present disclosure provides an example illustrating the position of the expansion acoustic structure 926 in the second chamber 923, as shown in FIG. 9. The expansion acoustic structure 926 may be positioned on two opposing side walls of the second chamber 923, causing an abrupt change in the cross-sectional area of the second chamber 923 at specific positions along the sound transmission path. In some embodiments, the expansion acoustic structure 926 may be an expansion chamber. The structural shape of the expansion chamber may be rectangular, as shown in FIG. 9. In other embodiments, the cross-sectional area of the expansion acoustic structure 926 may have different shapes, such as a triangular, a trapezoidal, or the like. The structural shape of the expansion chamber may be reasonably determined based on the phase difference between a first sound and a second sound.

As illustrated in FIG. 9, the sound waves radiated from a front side of the acoustic driver 921 propagate outward through the first sound outlet 924, covering a distance of the first path length $L_1$. The sound waves radiated from a rear side of the acoustic driver 921 pass through the expansion acoustic structure 926 and the second chamber 923, and then radiate outward through the second sound outlet 925, covering a distance of the second path length $L_2$. In the first path length $L_1$, the sound speed is the normal speed c, while in the second path length $L_2$, the sound speed is the equivalent speed c'. A time delay difference between the first sound radiated from the first sound outlet 924 and the second sound radiated from the second sound outlet 925 is:

$$\Delta\tau = \frac{L_2}{c'} - \frac{L_1}{c}, \tag{13}$$

Wherein, c represents the normal speed of sound, and c' represents the equivalent speed of sound in the presence of the expansion acoustic structure 926. Consequently, the phase difference φ between the first sound and the second sound is:

$$\varphi = 180° - 2\pi f \cdot \Delta\tau. \quad (14)$$

Therefore, it may be understood that an actual output phase difference between the first sound and the second sound may be controlled by setting the expansion acoustic structure 926 in the chamber to control the equivalent speed of sound when the sound waves propagate in the chamber, allowing the phase difference to be within a range of 120° to 179°. This enables the sound emitting part 900 to radiate sound towards a far field with strong directivity (such as a cardioid or super-cardioid pattern).

Furthermore, in this embodiment, it may be observed that, the phase difference between the first sound and the second sound is inversely correlated with frequency, provided that other parameters (e.g., the first sound path, the second sound path, and the equivalent speed of sound) are the same. The higher the frequency, the smaller the phase difference between the first sound and the second sound; the lower the frequency, the larger the phase difference between the first sound and the second sound.

Figure 10A:
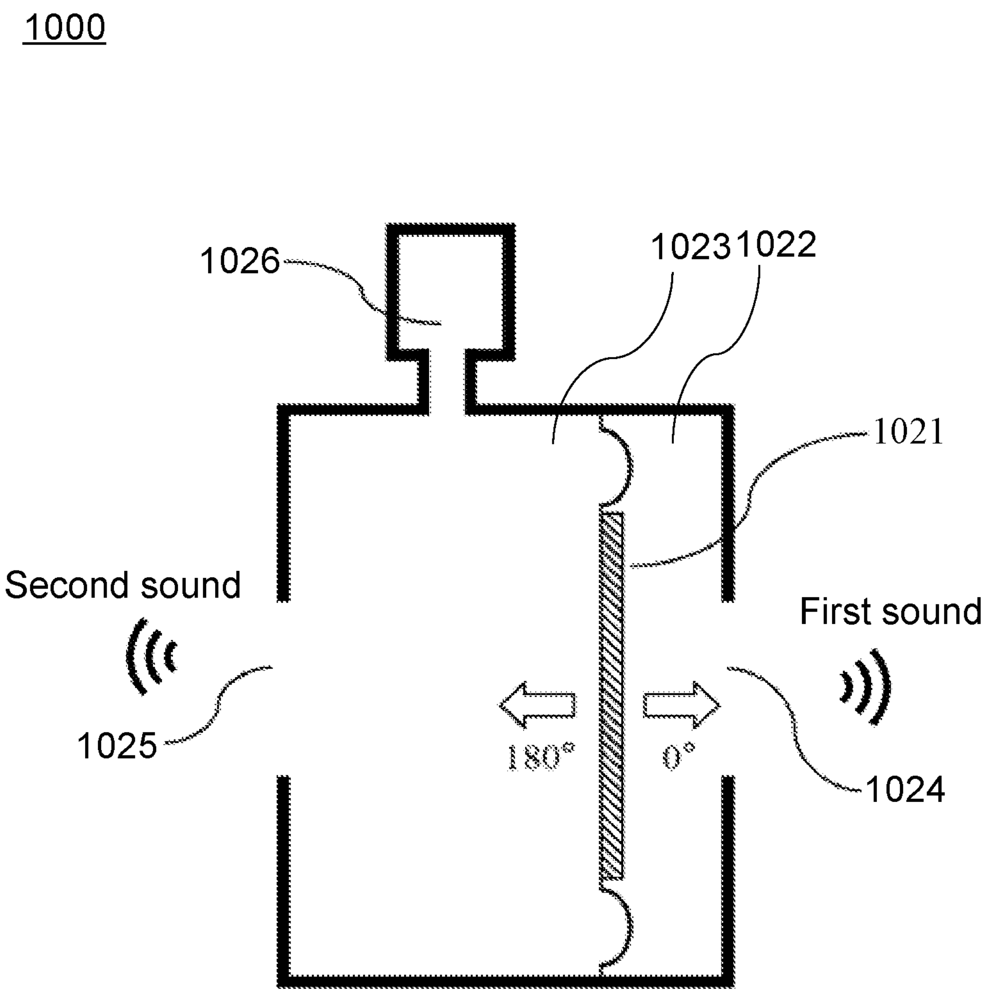
FIG. 10A is an exemplary schematic diagram illustrating yet another exemplary sound emitting part according to some embodiments of the present disclosure.

FIG. 10A is an exemplary schematic diagram illustrating yet another exemplary sound emitting part according to some embodiments of the present disclosure. A structure of a sound emitting part 1000 shown in FIG. 10A is similar to the structure of the sound emitting part 700 shown in FIG. 7A. For example, the sound emitting part 1000 may include at least one acoustic driver 1021, a first chamber 1022, and a second chamber 1023. The first chamber 1022 may have at least one first sound outlet 1024, and the second chamber 1023 may have at least one second sound outlet 1025. Further details regarding the acoustic driver 1021, the first chamber 1022, the second chamber 1023, the first sound outlet 1024, and the second sound outlet 1025 may be found in the relevant description of FIG. 7A. The difference between the sound emitting part 1000 and the sound emitting part 700 lies in differences in an acoustic structure(s). As shown in FIG. 10A, at least one of the first chamber 1022 or the second chamber 1023 of the sound emitting part 1000 may be equipped with a sound absorption structure 1026. In some embodiments, the sound absorption structure 1026 may have a resonant frequency. An actual output phase difference between a first sound and a second sound may be controlled by modulating (e.g., phase modulation) sounds near the resonant frequency of the sound absorption structure 1026. In some embodiments, the sound absorption structure 1026 may be a Helmholtz resonator. In some embodiments, the sound absorption structure 1026 may be a microperforated panel resonator. In some embodiments, the sound absorption structure 1026 may be a quarter-wave tube resonator.

In the embodiment, the sound absorption structure 1026 is shown as being positioned in the second chamber 1023 for illustration purposes. The sound absorption structure 1026 may be positioned on the side walls of the second chamber 1023 and acoustically connected to the second chamber 1023. Taking the Helmholtz resonator as an example, the resonant frequency $f_0$ of the Helmholtz resonator may be given by a formula (15):

$$f_0 = \frac{1}{2\pi}\sqrt{\frac{1}{MC}}, \quad (15)$$

Wherein, M represents acoustic mass (mainly related to duct parameters of the Helmholtz resonator), and C represents acoustic volume (mainly related to chamber parameters at a rear of the Helmholtz resonator).

Figure 10B:
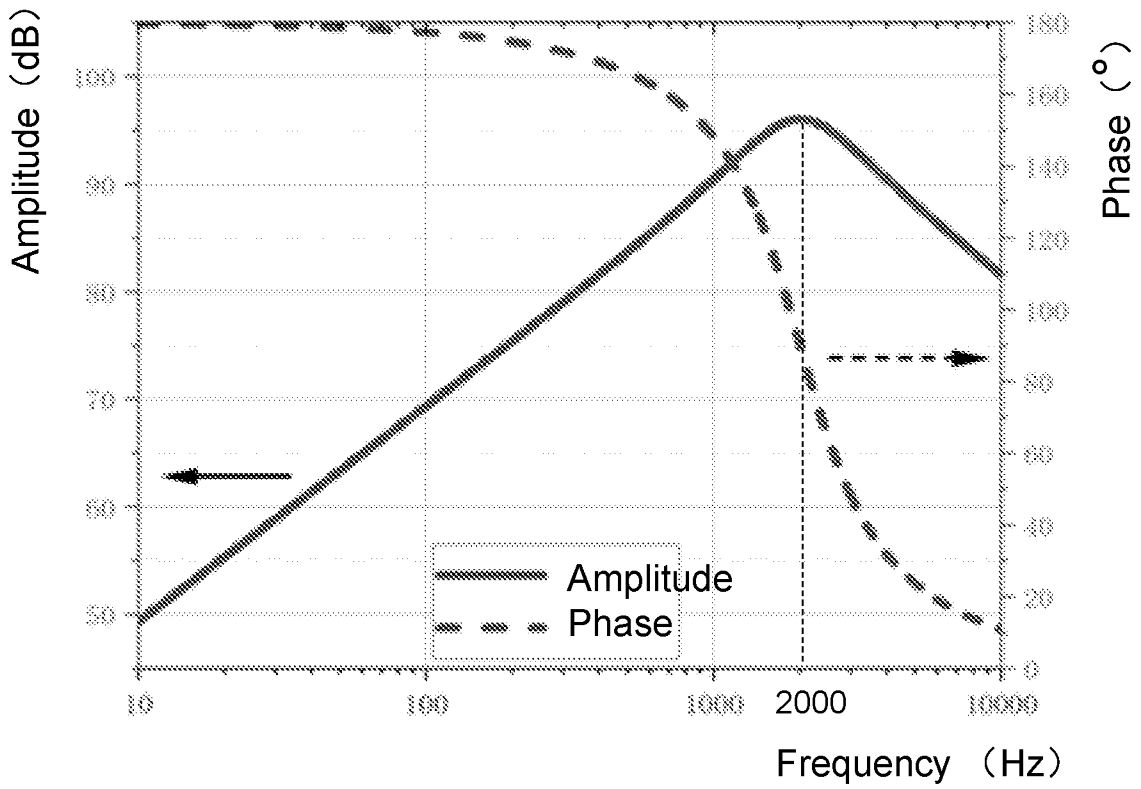
FIG. 10B is a schematic diagram illustrating a frequency response of a Helmholtz resonator.

FIG. 10B is a schematic diagram illustrating a frequency response of the Helmholtz resonator in FIG. 10A. A horizontal axis represents frequency in Hz, and a vertical axis represents amplitude response (in dB) or phase response (in deg). A solid line represents the amplitude response of the frequency response, while a dashed line represents the phase response. As shown in FIG. 10B, when the resonant frequency $f_0$ of the Helmholtz resonator is 2000 Hz, a resonance peak appears in the amplitude response at 2000 Hz, and the phase response gradually changes from 180° to approaching 0° as the frequency increases. Therefore, within a low-frequency range (e.g., between 40 Hz and 1000 Hz), a phase difference varies within a range of 179° to 150°, which essentially satisfies the phase difference requirement for achieving cardioid or super-cardioid directivity as described in the present disclosure. Thus, by setting the sound absorption structure 1026 in the chamber to control a phase of a sound radiated from a corresponding sound outlet, an actual output phase difference between a first sound and a second sound may be controlled, enabling the sound radiated by the sound emitting part 900 towards a far field to exhibit strong directivity (e.g., a cardioid or a super-cardioid pattern).

In some embodiments, to satisfy the requirement of the phase difference between the first sound and the second sound within a certain range before the resonant frequency of the sound absorption structure 1026 (e.g., in a low-frequency range below 1000 Hz), the resonant frequency of the sound absorption structure 1026 may be set between 1000 Hz and 3000 Hz. In some embodiments, to satisfy the requirement of the phase difference between the first sound and the second sound within a certain range before the resonant frequency of the sound absorption structure 1026, the resonance frequency of the sound absorption structure 1026 may be set between 1000 Hz and 2500 Hz. In some embodiments, to satisfy the requirement of the phase difference between the first sound and the second sound within a certain range before the resonant frequency of the sound absorption structure 1026, the resonant frequency of the sound absorption structure 1026 may be set between 1000 Hz and 2000 Hz. In some embodiments, to satisfy the requirement of the phase difference between the first sound and the second sound within a certain range before the resonant frequency of the sound absorption structure 1026, the resonance frequency of the sound absorption structure 1026 may be set between 1100 Hz and 1900 Hz. In some embodiments, to satisfy requirement of the phase difference between the first sound and the second sound within a certain range before the resonant frequency of the sound absorption structure 1026, the resonant frequency of the sound absorption structure 1026 may be set between 1200 Hz and 1800 Hz.

Figure 11:
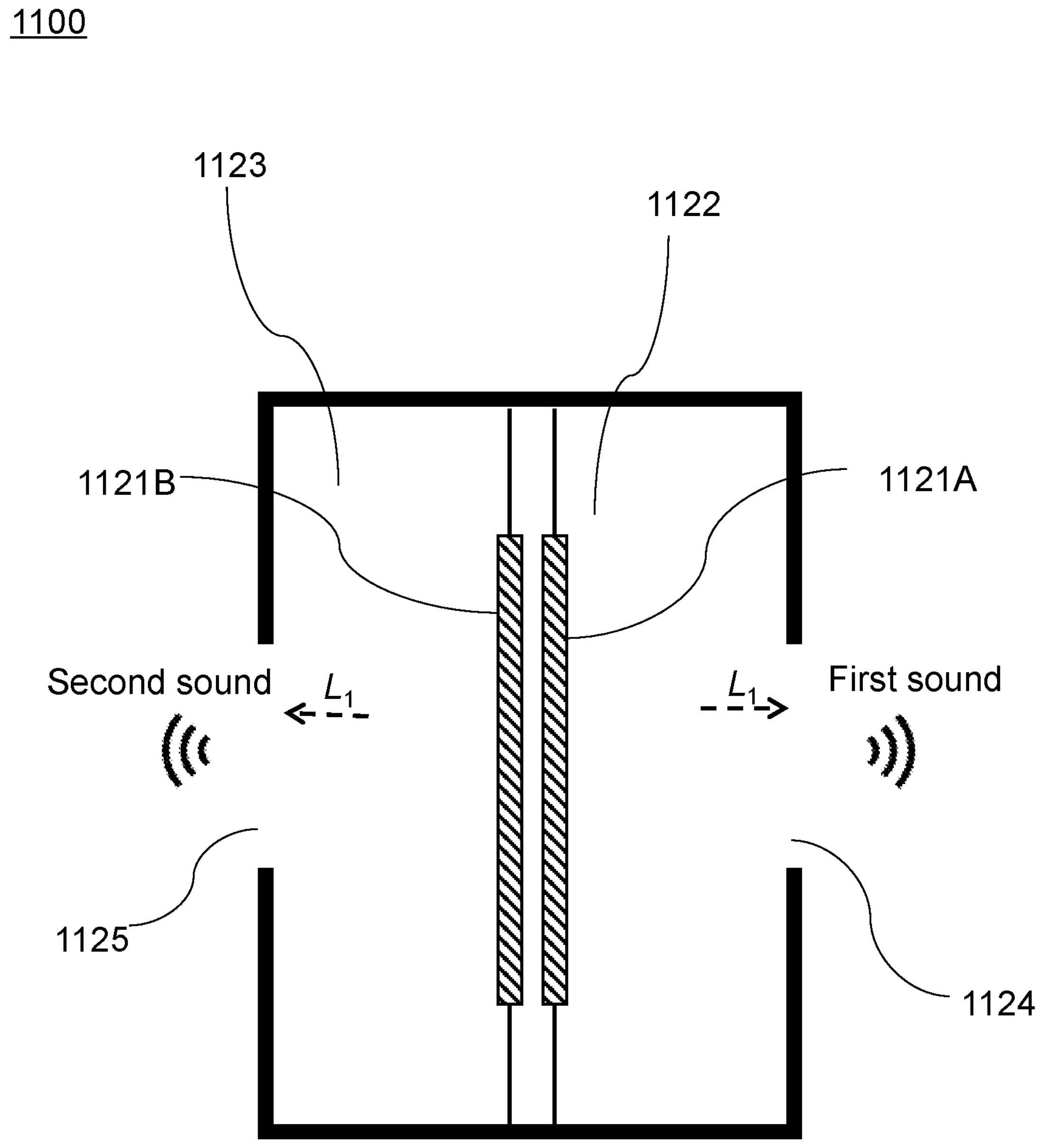
FIG. 11 is an exemplary structural diagram of a sound emitting part with two acoustic drivers according to some embodiments of the present disclosure.
Figure 12:
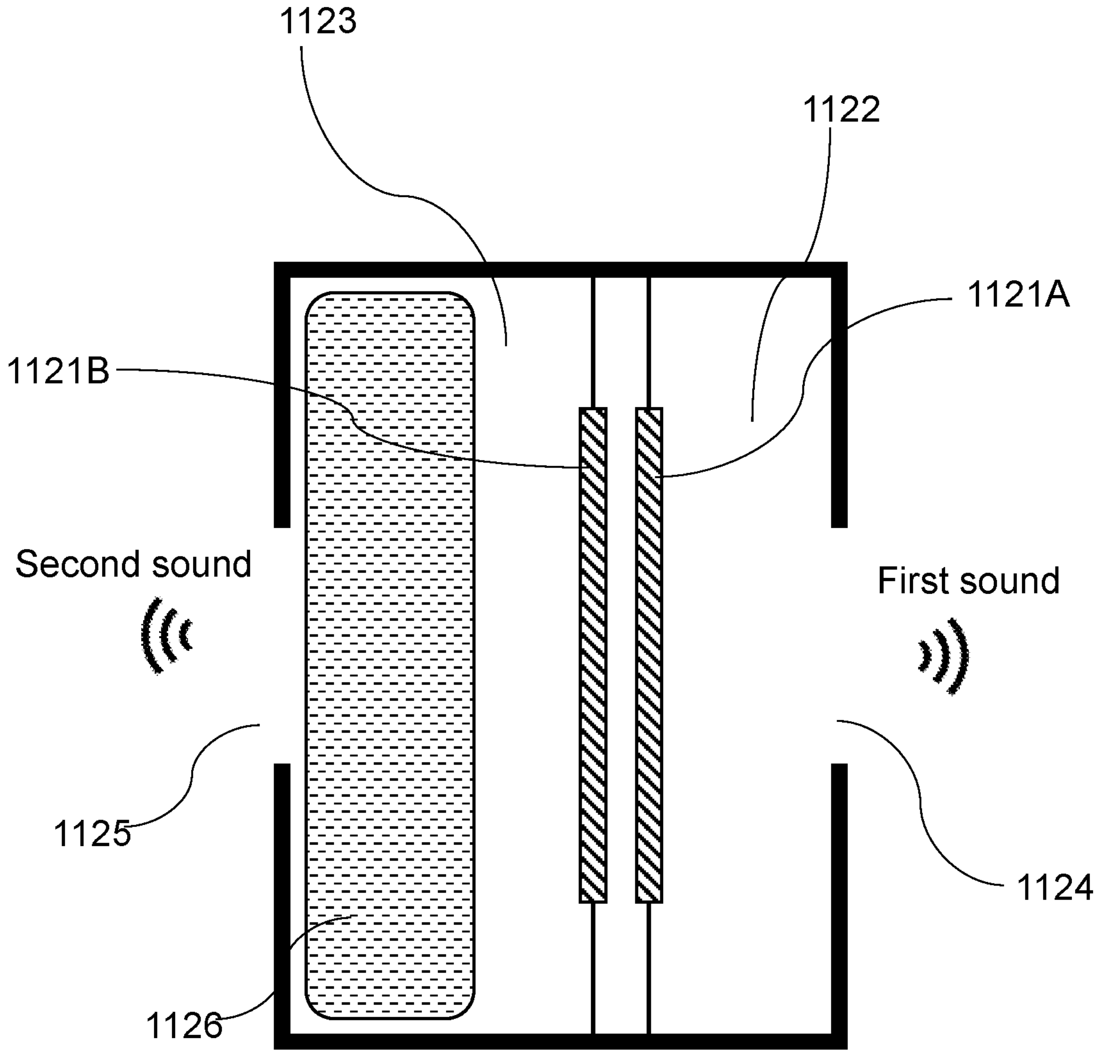
FIG. 12 is an exemplary structural diagram of the sound emitting part with two acoustic drivers according to other embodiments of the present disclosure.

In some embodiments, when at least one acoustic driver of the sound emitting part is a single driver or includes two acoustic drivers, the phase difference between the first sound and the second sound may be adjusted using the manners described in FIGS. 7A to 10A. In such control manners, the phase difference of sounds radiated by the at least one acoustic driver to the first chamber and the second chamber is 180°. By setting different types of acoustic structures (e.g., baffles, slow acoustic structures, expansion acoustic structures, sound absorption structures) in the chambers, the phase of the first sound or the second sound may be altered, thereby adjusting the phase difference between the first sound and the second sound. In some embodiments, when the at least one acoustic driver includes two acoustic drivers, the phase difference between the first sound and the second sound may also be adjusted by controlling electrical drive signals corresponding to the two acoustic drivers. In some embodiments, the phases of the two electrical drive signals may be set separately, so that a phase of a sound radiated by one acoustic driver to the first chamber is not completely opposite to a phase of a sound radiated by the other acoustic driver to the second chamber. For example, FIG. 11 is an exemplary structural diagram of the sound emitting part with two acoustic drivers according to some embodiments of the present disclosure. As shown in FIG. 11, a sound emitting part 1100 may include a first acoustic driver 1121A, a second acoustic driver 1121B, a first chamber 1122, and a second chamber 1123. The first chamber 1122 may have at least one first sound outlet 1124, and the first acoustic driver 1121A may radiate the first sound to the outside through the first chamber 1122 and the first sound outlet 1124. The second chamber 1123 may have at least one second sound outlet 1125, and the second acoustic driver 1121B may radiate the second sound to the outside through the second chamber 1123 and the second sound outlet 1125. In some embodiments, the first acoustic driver 1121A and the second acoustic driver 1121B may be driven by two sets of electrical signals. By setting different phases for the two sets of electrical drive signals, the phase difference between the first sound and the second sound may be in a range of 120° to 179°. For example, as shown in FIG. 11, the phase difference between an electrical drive signal driving the first acoustic driver 1121A and an electrical drive signal driving the second acoustic driver 1121B may be set to be in the range of 120° to 179°. In this configuration, no other acoustic structures need to be set in the first chamber 1122 and the second chamber 1123, and sound paths in the respective chambers are approximately the same, thereby achieving a phase difference between the first sound and the second sound of 120° to 179°. Alternatively, as shown in FIG. 12, the phase difference between the electrical drive signal driving the first acoustic driver 1121A and the electrical drive signal driving the second acoustic driver 1121B may be set not in the range of 120° to 179°. In this configuration, acoustic structures (e.g., a slow acoustic structure 1126 shown in FIG. 12) may be set in at least one of the first chamber 1122 or the second chamber 1123 to achieve such that the phase difference between the first sound and the second sound is between 120° and 179°.

The beneficial effects that may be achieved by the acoustic output device described in the embodiments of the present disclosure include, but are not limited to: (1) By adjusting the phase difference between two sounds generated by the sound emitting part, the acoustic output device can exhibit directivity in a low-frequency range when radiating sound to a far field. This allows a maximum volume to be perceived by a listener in a direction of the listener's ear canal opening when wearing the acoustic output device, while minimizing sound leakage in an opposite direction of the ear canal opening and in other directions. This provides a better balance between ear canal opening openness and auditory privacy. (2) By setting various acoustic structures (such as baffles, slow acoustic structures, expansion acoustic structures, and sound absorption structures) in the sound emitting part of the acoustic output device to adjust the phase difference between the two sounds generated, the control of the phase difference becomes more flexible and precise, thereby enhancing the practicality of the acoustic output device. (3) When at least one acoustic driver in the sound emitting part includes two acoustic drivers, direct control of two electrical drive signals allows for adjustment of the phase difference between the two sounds, leading to a simpler and more cost-effective structure of the acoustic output device.

The basic concept has been described above, obviously, for those skilled in the art, the above detailed disclosure is only an example, and does not constitute a limitation to the present disclosure. Although not expressly stated here, those skilled in the art may make various modifications, improvements and corrections to the present disclosure. Such modifications, improvements and corrections are suggested in the present disclosure, so such modifications, improvements and corrections still belong to the spirit and scope of the exemplary embodiments of the present disclosure.

Meanwhile, the present disclosure uses specific words to describe the embodiments of the present disclosure. For example, "one embodiment", "an embodiment", and/or "some embodiments" refer to a certain feature, structure, or characteristic related to at least one embodiment of the present disclosure. Therefore, it should be emphasized and noted that two or more references to "one embodiment" or "an embodiment" or "an alternative embodiment" in different places in the present disclosure do not necessarily refer to the same embodiment. In addition, certain features, structures or characteristics in one or more embodiments of the present disclosure may be properly combined.

In addition, unless explicitly stated in the claims, the order of processing elements and sequences described in the present disclosure, the use of numbers and letters, or the use of other names are not configured to limit the sequence of processes and methods in the present disclosure. While the foregoing disclosure has discussed by way of various examples some embodiments of the invention that are presently believed to be useful, it should be understood that such detail is for illustrative purposes only and that the appended claims are not limited to the disclosed embodiments, but rather, the claims are intended to cover all modifications and equivalent combinations that fall within the spirit and scope of the embodiments of the present disclosure. For example, although the implementation of various components described above may be embodied in a hardware device, it may also be implemented as a software only solution, e.g., an installation on an existing server or mobile device.

In the same way, it should be noted that in order to simplify the expression disclosed in the present disclosure and help the understanding of one or more embodiments of the present disclosure, in the foregoing description of the embodiments of the present disclosure, sometimes multiple features are combined into one embodiment, drawings or descriptions thereof. This way of disclosure does not, however, imply that the subject matter of the present disclosure requires more features than are recited in the claims. Rather, claimed subject matter may lie in less than all features of a single foregoing disclosed embodiment.

In some embodiments, numbers describing a quantity of components and attributes are used. It should be understood that such numbers used in the description of the embodiments use the modifiers "about", "approximately" or "substantially" in some examples. Unless otherwise stated, "about", "approximately" or "substantially" indicates that the stated figure allows for a variation of ±20%. Accordingly, in some embodiments, the numerical parameters used in the present disclosure and the claims are approximations that may vary depending upon the desired characteristics of individual embodiments. In some embodiments, the numerical parameters should be construed in light of the number of reported significant digits and by applying ordinary rounding techniques. Although the numerical ranges and parameters used in some embodiments of the present disclosure to confirm the breadth of the range are approximations, in specific embodiments, such numerical values are set as precisely as practicable.

Finally, it should be understood that the embodiments described in the present disclosure are provided merely to illustrate the principles of the embodiments disclosed in the present disclosure. Other variations may also fall within the scope of the present disclosure. The specific embodiments disclosed in the present disclosure are exemplary, and one or more technical features in the specific embodiments may be optional or additional and do not constitute essential technical features of the inventive concept of the present disclosure. In other words, the scope of protection of the present disclosure encompasses and extends beyond the specific embodiments. Therefore, alternative configurations to the exemplary embodiments of the present disclosure may be considered consistent with the teachings of the present disclosure, but are not limited to the explicit embodiments disclosed and described in the present disclosure.

What is claimed is:

1. An acoustic output device, comprising: a sound emitting part including: at least one acoustic driver; a first chamber and a second chamber acoustically coupled to the at least one acoustic driver, the first chamber having at least one first sound outlet and the second chamber having at least one second sound outlet, and the at least one acoustic driver radiating a first sound to the outside through the at least one first sound outlet and a second sound to the outside through the at least one second sound outlet sounds to the outside through the at least one first sound outlet and the at least one second sound outlet, wherein in at least a portion of a low-frequency range, the sounds emitted by the sound emitting part towards a far field exhibit directivity, the directivity is characterized by the sounds radiated from the at least one first sound outlet and the at least one second sound outlet having a sound pressure difference of at least 3 dB in at least one pair of opposite directions, wherein a phase difference between the first sound and the second sound is in a range of 140° to 155°.

2. The acoustic output device of claim 1, wherein the at least one acoustic driver is a single acoustic driver, and the single acoustic driver has a front side and a rear side, and radiates the sounds to the first chamber and the second chamber, respectively, through the front side and the rear side.

3. The acoustic output device of claim 1, wherein the at least one acoustic driver includes two acoustic drivers, and the two acoustic drivers radiate the sounds to the first chamber and the second chamber, respectively, wherein heights of acoustic centers of the two acoustic drivers are the same.

4. The acoustic output device according to claim 1, wherein the phase difference between the first sound and the second sound is inversely correlated with frequency within a predetermined frequency range.

5. The acoustic output device according to claim 1, wherein the first sound propagates in the first chamber with a first sound path, and the second sound propagates in the second chamber with a second sound path, and the first sound path and the second sound path have a sound path difference.

6. The acoustic output device according to claim 5, wherein at least one of the first chamber or the second chamber is equipped with an acoustic structure, and the acoustic structure includes one or more baffles, the sounds bypassing each of the one or more baffles.

7. The acoustic output device according to claim 1, wherein the first chamber or the second chamber is equipped with at least one of an acoustic mesh or an acoustic porous material, wherein the acoustic mesh or the acoustic porous material includes a slow acoustic structure, and a speed of sound transmission is slowed down within the slow acoustic structure.

8. The acoustic output device according to claim 1, wherein the first chamber or the second chamber is equipped with an expansion acoustic structure, and the expansion acoustic structure changes a cross-sectional area of the first chamber or the second chamber at different positions along a sound transmission path.

9. The acoustic output device according to claim 1, wherein the first chamber or the second chamber is equipped with a sound absorption structure, and a resonant frequency of the sound absorption structure is in a range of 1000 Hz to 3000 Hz.

10. The acoustic output device according to claim 3, wherein electrical drive signals corresponding to the two acoustic drivers have different phases.

11. The acoustic output device according to claim 1, further comprising:

a support structure designed to be worn on a user's head or upper body, wherein the support structure is configured to support the sound emitting part and position the sound emitting part near the user's ears without blocking the ear canal opening.

12. An acoustic output device comprising: a sound emitting part including:

at least one acoustic driver; a first chamber and a second chamber acoustically coupled to the at least one acoustic driver, the first chamber having at least one first sound outlet and the second chamber having at least one second sound outlet, wherein the at least one acoustic driver radiates a first sound to the outside through the first chamber and at least one first sound outlet, and radiates a second sound to the outside through the second chamber and at least one second sound outlet, at 1000 Hz, a phase difference between the first sound and the second sound is in a range of 140° to 155°.

13. The acoustic output device according to claim 12, wherein a distance between an acoustic center of the first sound outlet and an acoustic center of the second sound outlet is within a range of 2 mm to 60 mm.

14. The acoustic output device according to claim 12, wherein, at 2000 Hz, the phase difference between the first sound and the second sound is in a range of 138° to 177°.

15. The acoustic output device according to claim 12, wherein, at one of a plurality of frequency values within a frequency range of 500 Hz to 3000 Hz, the phase difference between the first sound and the second sound is in a range of 121° to 179°.

16. The acoustic output device according to claim 12, wherein, at 200 Hz, the phase difference between the first sound and the second sound is greater than 175° and less than 179.8°.

17. The acoustic output device according to claim 12, wherein a direction with the directivity is oriented towards a user's ear canal opening when the user wears the acoustic output device.

18. The acoustic output device according to claim 1, wherein a first sound source and a second sound source formed by the sound emitting part, and the first sound source and the second sound source form a cardioid directional radiated sound field or a hyper-cardioid directional radiated sound field.

* * * * *